United States Patent
Wei et al.

(10) Patent No.: US 11,209,894 B2
(45) Date of Patent: *Dec. 28, 2021

(54) TASK MANAGEMENT METHOD AND DEVICE

(71) Applicant: Huawei Device Co., Ltd., Guangdong (CN)

(72) Inventors: Konggang Wei, Shenzhen (CN); Yu Peng, Shanghai (CN); Jing Zhao, Beijing (CN)

(73) Assignee: Huawei Device Co., Ltd., Dongguan (CN)

( * ) Notice: Subject to any disclaimer, the term of this patent is extended or adjusted under 35 U.S.C. 154(b) by 107 days.

This patent is subject to a terminal disclaimer.

(21) Appl. No.: 16/427,944

(22) Filed: May 31, 2019

(65) Prior Publication Data

US 2019/0286213 A1 Sep. 19, 2019

Related U.S. Application Data

(63) Continuation of application No. 15/102,459, filed as application No. PCT/CN2014/093028 on Dec. 4, 2014, now Pat. No. 10,345,890.

(30) Foreign Application Priority Data

Dec. 10, 2013 (CN) .......................... 201310665434.9

(51) Int. Cl.
*G06F 9/46* (2006.01)
*G06F 1/329* (2019.01)
*G06F 1/3228* (2019.01)

(52) U.S. Cl.
CPC ............ *G06F 1/329* (2013.01); *G06F 1/3228* (2013.01); *Y02D 10/00* (2018.01)

(58) Field of Classification Search
CPC ..................................................... G06F 9/4843
(Continued)

(56) References Cited

U.S. PATENT DOCUMENTS 6,574,734 B1 * 6/2003 Colson .................... G06F 9/445
 701/1
7,146,439 B1 * 12/2006 Ofer ...................... G06F 3/0611
 710/45
(Continued)

FOREIGN PATENT DOCUMENTS

CN 1245921 A 3/2000
CN 101114875 A 1/2008
(Continued)

OTHER PUBLICATIONS

XP055551897, Brockschmidt, K., "Programming Windows 8 Apps with HTML, CSS, and JavaScript," Microsoft Press, Oct. 26, 2012, 416 pages.
(Continued)

*Primary Examiner* — Mehran Kamran
(74) *Attorney, Agent, or Firm* — Conley Rose, P.C.

(57) ABSTRACT

A task management method and device where the method includes determining, according to a foreground task, a first scenario corresponding to the foreground task, searching for at least one background task corresponding to the first scenario when the first scenario corresponding to the foreground task is in a first list, where the first list includes a scenario in which task limitation is allowed, and performing limitation processing on the at least one background task corresponding to the first scenario, where the limitation processing refers to processing for reducing system resource usage.

20 Claims, 12 Drawing Sheets

(58) Field of Classification Search
USPC .......................................................... 718/100
See application file for complete search history.

(56) References Cited

U.S. PATENT DOCUMENTS

| | | | | |
|---|---|---|---|---|
| 7,991,633 | B2* | 8/2011 | Baker | G06Q 10/10 705/7.13 |
| 8,140,830 | B2 | 3/2012 | Schwinn et al. | |
| 2001/0029519 | A1* | 10/2001 | Hallinan | G06F 9/546 718/104 |
| 2003/0050956 | A1* | 3/2003 | Janssen | G06F 11/302 709/201 |
| 2005/0028160 | A1* | 2/2005 | Cofer | G06F 9/4881 718/100 |
| 2005/0246514 | A1 | 11/2005 | Nishida | |
| 2006/0095919 | A1* | 5/2006 | Shiomi | G06F 9/5022 718/104 |
| 2007/0136731 | A1* | 6/2007 | Bennington | G06Q 10/00 718/103 |
| 2008/0034208 | A1* | 2/2008 | Mantere | G06F 21/44 713/164 |
| 2009/0132754 | A1* | 5/2009 | Riska | G06F 3/0611 711/103 |
| 2009/0239480 | A1* | 9/2009 | Rofougaran | H04L 12/40013 455/73 |
| 2010/0146509 | A1* | 6/2010 | Kaczynski | G06F 9/5055 718/101 |
| 2010/0185882 | A1* | 7/2010 | Arnold | G06F 1/3203 713/320 |
| 2011/0249668 | A1 | 10/2011 | Van Milligan et al. | |
| 2012/0036220 | A1* | 2/2012 | Dare | H04L 67/04 709/217 |
| 2012/0206653 | A1* | 8/2012 | Graves | G06F 16/113 348/571 |
| 2012/0260118 | A1* | 10/2012 | Jiang | G06F 9/4893 713/340 |
| 2013/0024812 | A1* | 1/2013 | Reeves | G09G 5/14 715/810 |
| 2013/0024868 | A1* | 1/2013 | Jeong | G06F 9/505 718/104 |
| 2013/0055267 | A1 | 2/2013 | Noro | |
| 2013/0061249 | A1* | 3/2013 | Schwartz, Jr. | G06F 9/445 719/318 |
| 2013/0061251 | A1* | 3/2013 | Schwartz, Jr. | G06F 9/4812 719/320 |
| 2013/0067475 | A1 | 3/2013 | Singh et al. | |
| 2013/0191541 | A1* | 7/2013 | Kishan | G06F 15/173 709/226 |
| 2013/0239114 | A1* | 9/2013 | Dinker | G06F 9/5011 718/104 |
| 2014/0040906 | A1* | 2/2014 | Kahn | G06F 9/4818 718/103 |
| 2014/0136729 | A1* | 5/2014 | Chan | G06F 9/5088 709/231 |
| 2014/0310724 | A1* | 10/2014 | Chan | G06F 9/4843 719/313 |
| 2014/0373032 | A1* | 12/2014 | Merry | G06F 9/4843 719/328 |
| 2014/0380075 | A1* | 12/2014 | Pulapaka | G06F 1/3293 713/323 |
| 2015/0024701 | A1* | 1/2015 | Nagashima | H04W 4/90 455/404.1 |
| 2017/0228260 | A1* | 8/2017 | Krishan | G06F 9/4881 |

FOREIGN PATENT DOCUMENTS

| | | |
|---|---|---|
| CN | 101923382 A | 12/2010 |
| CN | 102508701 A | 6/2012 |
| CN | 102541246 A | 7/2012 |
| CN | 102768571 A | 11/2012 |
| CN | 102945344 A | 2/2013 |
| CN | 102984359 A | 3/2013 |
| CN | 103493017 A | 1/2014 |
| EP | 0942366 A2 | 9/1999 |
| EP | 1730635 B1 | 2/2008 |
| JP | 2005316764 A | 11/2005 |
| JP | 2013045373 A | 3/2013 |
| JP | 2013524362 A | 6/2013 |
| KR | 20060134185 A | 12/2006 |
| KR | 20130048290 A | 5/2013 |
| KR | 20140067041 A | 6/2014 |

OTHER PUBLICATIONS

Machine Translation and Abstract of Korean Publication No. KR20130048290, May 9, 2013, 26 pages.
Machine Translation and Abstract of Korean Publication No. KR20140067041, Jun. 3, 2014, 39 pages.
Machine Translation and Abstract of Chinese Publication No. CN101923382, Dec. 22, 2010, 15 pages.
Partial English Translation and Abstract of Chinese Patent Application No. CN102508701, Jan. 9, 2017, 18 pages.
Partial English Translation and Abstract of Chinese Patent Application No. CN102541246, Jul. 4, 2012, 4 pages.
Partial English Translation and Abstract of Chinese Patent Application No. CN102768571, Nov. 7, 2012, 3 pages.
Foreign Communication From a Counterpart Application, Korean Application No. 2018-059160433, Korean Notice of Allowance dated Aug. 30, 2018, 2 pages.
Foreign Communication From a Counterpart Application, Korean Application No. 10-2016-7016247, Korean Office Action dated Feb. 14, 2018, 6 pages.
Foreign Communication From a Counterpart Application, Korean Application No. 10-2016-7016247, English Translation of Korean Office Action dated Feb. 14, 2018, 4 pages.
Foreign Communication From a Counterpart Application, Chinese Application No. 201310665434.9, Chinese Office Action dated Mar. 7, 2018, 9 pages.
Foreign Communication From a Counterpart Application, Japanese Application No. 2016-538038, Japanese Office Action dated Feb. 19, 2018, 6 pages.
Foreign Communication From a Counterpart Application, Japanese Application No. 2016-538038, English Translation of Japanese Office Action dated Feb. 19, 2018, 6 pages.
Foreign Communication From a Counterpart Application, Korean Application No. 10-2016-7016247, Korean Office Action dated Aug. 25, 2017, 6 pages.
Foreign Communication From a Counterpart Application, Korean Application No. 10-2016-7016247, English Translation of Korean Office Action dated Aug. 25, 2017, 4 pages.
Foreign Communication From a Counterpart Application, Japanese Application No. 2016-538038, Japanese Office Action dated Jul. 4, 2017, 6 pages.
Foreign Communication From a Counterpart Application, Japanese Application No. 2016-538038, English Translation of Japanese Office Action dated Jul. 4, 2017, 6 pages.
Foreign Communication From a Counterpart Application, Chinese Application No. 201310665434.9, Chinese Office Action dated Dec. 5, 2016, 11 pages.
Foreign Communication From a Counterpart Application, Chinese Application No. 201310665434.9, Chinese Search Report dated Nov. 26, 2016, 2 pages.
Foreign Communication From a Counterpart Application, PCT Application No. PCT/CN2014/093028, English Translation of International Search Report dated Mar. 6, 2015, 2 pages.
Foreign Communication From a Counterpart Application, PCT Application No. PCT/CN2014/093028, English Translation of Written Opinion dated Mar. 6, 2015, 6 pages.

* cited by examiner

TASK MANAGEMENT METHOD AND DEVICE

CROSS-REFERENCE TO RELATED APPLICATIONS

This application is a continuation of U.S. patent application Ser. No. 15/102,459 filed on Jun. 7, 2016, which is a National Stage of International Application No. PCT/CN2014/093028 filed on Dec. 4, 2014, which claims priority to Chinese Patent Application No. 201310665434.9 filed on Dec. 10, 2013. All of the aforementioned applications are hereby incorporated by reference in their entireties.

TECHNICAL FIELD

The present disclosure relates to the communications field, and in particular, to a task management method and device.

BACKGROUND

With development of communications technologies, currently many devices support a multi-task system, that is, a device may run multiple application programs at the same time, and one application program may have one or more threads, each of which is referred to as a task. Multiple tasks usually include a foreground task and a background task. The foreground task refers to a task that requires user interaction, that is, an operation input by a user needs to be received during execution of the foreground task. The background task refers to a task that does not require user interaction, that is, an operation input by a user does not need to be received during execution of the background task. Because the background task does not require user interaction, the background task is generally not a user-sensitive task, or the background task is not of user concern. In other words, some background tasks do not need to be executed. However, the background tasks are continually executed in the background of a system, and continuously consume power of a device. It can be seen that, currently a device may suffer from great power consumption and power loss.

SUMMARY

Embodiments of the present disclosure provide a task management method and device, to reduce power consumption and power loss of a device.

According to a first aspect, an embodiment of the present disclosure provides a task management method, including determining, according to a foreground task, a first scenario corresponding to the foreground task, searching for, when the first scenario corresponding to the foreground task is in a first list, at least one background task corresponding to the first scenario, where the first list includes a scenario in which task limitation is allowed, and performing limitation processing on the at least one background task corresponding to the first scenario, where the limitation processing refers to processing for reducing system resource usage.

In a first possible implementation manner of the first aspect, the method further includes searching for a second scenario except the first scenario corresponding to the foreground task, where the second scenario corresponds to at least one background task, and the first list includes the second scenario, and performing the limitation processing on the at least one background task corresponding to the second scenario.

With reference to the first aspect or the first possible implementation manner of the first aspect, in a second possible implementation manner of the first aspect, after determining, according to a foreground task, a first scenario corresponding to the foreground task, the method further includes determining whether the first scenario is in the first list.

With reference to the first aspect, in a third possible implementation manner of the first aspect, before performing limitation processing on the at least one background task corresponding to the first scenario, the method further includes querying a user identifier of the at least one background task, ignoring the at least one background task if the user identifier of the at least one background task corresponds to a system user, performing the limitation processing on the at least one background task if the user identifier of the at least one background task corresponds to a common user.

With reference to the first aspect, in a fourth possible implementation manner of the first aspect, before performing limitation processing on the at least one background task corresponding to the first scenario, the method further includes starting a timer for the at least one background task corresponding to the first scenario, and stopping a system component used by the at least one background task corresponding to the first scenario when the timer exceeds a preset threshold.

With reference to the first aspect, in a fifth possible implementation manner of the first aspect, before performing limitation processing on the at least one background task corresponding to the first scenario, the method further includes querying whether the at least one background task uses a system component, and stopping the system component if the at least one background task uses the system component.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, processing for reducing system resource usage includes at least one of the following manners freezing the at least one background task, stopping the at least one background task, and limiting a system resource used by the at least one background task.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a seventh possible implementation manner of the first aspect, determining, according to a foreground task, a first scenario corresponding to the foreground task includes determining, according to at least one foreground task, a first scenario corresponding to each foreground task.

According to a second aspect, an embodiment of the present disclosure provides a task management method, including determining, according to a foreground task, a first scenario corresponding to the foreground task, determining a second scenario except the first scenario corresponding to the foreground task, where the second scenario is a scenario in which task limitation is allowed and the second scenario corresponds to at least one background task, searching for the at least one background task corresponding to the second scenario, and performing limitation processing on the at least one background task corresponding to the second scenario, where the limitation processing refers to processing for reducing system resource usage.

In a first possible implementation manner of the second aspect, the method further includes searching for at least one background task corresponding to the first scenario, and performing the limitation processing on the at least one background task corresponding to the first scenario if a user identifier of the at least one background task corresponding to the first scenario corresponds to a common user.

With reference to the second aspect, in a second possible implementation manner of the second aspect, before performing limitation processing on the at least one background task corresponding to the second scenario, the method further includes starting a timer for the at least one background task corresponding to the second scenario, and stopping a system component used by the at least one background task corresponding to the second scenario, when the timer exceeds a preset threshold.

With reference to the second aspect, in a third possible implementation manner of the second aspect, before performing limitation processing on the at least one background task corresponding to the second scenario, the method further includes querying whether the at least one background task uses a system component, and stopping the system component if the at least one background task uses the system component.

With reference to the second aspect, the first possible implementation manner of the second aspect, the second possible implementation manner of the second aspect, or the third possible implementation manner of the second aspect, in a fourth possible implementation manner of the second aspect, processing for reducing system resource usage includes at least one of the following manners: freezing the at least one background task, stopping the at least one background task, and limiting a system resource used by the at least one background task.

With reference to the second aspect, the first possible implementation manner of the second aspect, the second possible implementation manner of the second aspect, or the third possible implementation manner of the second aspect, in a fifth possible implementation manner of the second aspect, determining, according to a foreground task, a first scenario corresponding to the foreground task includes determining, according to at least one foreground task, a first scenario corresponding to each foreground task.

According to a third aspect, an embodiment of the present disclosure provides a task management method, including a determining unit, a first search unit, and a first processing unit, where the determining unit is configured to determine, according to a foreground task, a first scenario corresponding to the foreground task. The first search unit is configured to search for, when the first scenario that corresponds to the foreground task and is determined by the determining unit is in a first list, at least one background task corresponding to the first scenario, where the first list includes a scenario in which task limitation is allowed, and the first processing unit is configured to perform limitation processing on the at least one background task that corresponds to the first scenario and is searched for by the first search unit, where the limitation processing refers to processing for reducing system resource usage.

In a first possible implementation manner of the third aspect, the device further includes a second search unit configured to search for a second scenario except the first scenario that corresponds to the foreground task and is searched for by the determining unit, where the second scenario corresponds to at least one background task, and the first list includes the second scenario, and a second processing unit configured to perform the limitation processing on the at least one background task that corresponds to the second scenario and is searched for by the second search unit.

With reference to the third aspect or the first possible implementation manner of the third aspect, in a second possible implementation manner of the third aspect, the device further includes a judging unit configured to determine whether the first scenario is in the first list.

With reference to the third aspect, in a third possible implementation manner of the third aspect, the device further includes a first query unit configured to query a user identifier of the at least one background task, and an ignoring unit configured to ignore the at least one background task if the user identifier that is of the at least one background task and queried by the first query unit corresponds to a system user, where the first processing unit is configured to perform the limitation processing on the at least one background task if the user identifier that is of the at least one background task and queried by the first query unit corresponds to a common user.

With reference to the third aspect, in a fourth possible implementation manner of the third aspect, the device further includes a timing unit configured to start a timer for the at least one background task corresponding to the first scenario, and a first stopping unit configured to stop, when the timer exceeds a preset threshold, a system component used by the at least one background task corresponding to the first scenario.

With reference to the third aspect, in a fifth possible implementation manner of the third aspect, the device further includes a second query unit configured to query whether the at least one background task uses a system component, and a second stopping unit configured to stop the system component if the second query unit finds that the at least one background task uses the system component.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner of the third aspect, the processing for reducing system resource usage includes at least one of the following manners: freezing the at least one background task, stopping the at least one background task, and limiting a system resource used by the at least one background task.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a seventh possible implementation manner of the third aspect, the determining unit is configured to determine, according to at least one foreground task, a first scenario corresponding to each foreground task.

According to a second aspect, an embodiment of the present disclosure provides a task management method, including a first determining unit, a second determining unit, a first search unit, and a first processing unit, where the first determining unit is configured to determine, according to a foreground task, a first scenario corresponding to the foreground task. The second determining unit is configured to determine a second scenario except the first scenario that corresponds to the foreground task and is determined by the first determining unit, where the second scenario is a scenario in which task limitation is allowed and the second scenario corresponds to at least one background task. The first search unit is configured to search for the at least one background task corresponding to the second scenario that is determined by the second determining unit, and the first processing unit is configured to perform limitation processing on the at least one background task that corresponds to the second scenario and is searched for by the first search unit, where the limitation processing refers to processing for reducing system resource usage.

In a first possible implementation manner of the second aspect, the device further includes a second search unit configured to search for at least one background task corresponding to the first scenario, and a second processing unit configured to perform the limitation processing on the at least one background task corresponding to the first scenario if a user identifier of the at least one background task corresponding to the first scenario corresponds to a common user.

With reference to the second aspect, in a second possible implementation manner of the second aspect, the device further includes a timing unit configured to start a timer for the at least one background task corresponding to the second scenario, and a first stopping unit configured to stop, when the timer exceeds a preset threshold, a system component used by the at least one background task corresponding to the second scenario.

With reference to the second aspect, in a third possible implementation manner of the second aspect, the device further includes a query unit configured to query whether the at least one background task uses a system component, and a second stopping unit configured to stop the system component if the query unit finds that the at least one background task uses the system component.

With reference to the second aspect, the first possible implementation manner of the second aspect, the second possible implementation manner of the second aspect, or the third possible implementation manner of the second aspect, in a fourth possible implementation manner of the second aspect, the processing for reducing system resource usage includes at least one of the following manners: freezing the at least one background task, stopping the at least one background task, and limiting a system resource used by the at least one background task.

With reference to the second aspect, the first possible implementation manner of the second aspect, the second possible implementation manner of the second aspect, or the third possible implementation manner of the second aspect, in a fifth possible implementation manner of the second aspect, the determining unit is configured to determine, according to at least one foreground task, a first scenario corresponding to each foreground task.

In the foregoing technical solutions, a first scenario corresponding to a foreground task is determined according to the foreground task, and when the first scenario corresponding to the foreground task is in a first list, at least one background task corresponding to the first scenario is searched for, where the first list includes a scenario in which task limitation is allowed, and limitation processing is performed on the at least one background task corresponding to the first scenario, where the limitation processing refers to processing for reducing system resource usage. In this way, limitation processing is implemented on at least one background task corresponding to a scenario in which task limitation is allowed. Compared with the prior art in which a background task is always being executed, the embodiments of the present disclosure can reduce power consumption and power loss of a device.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
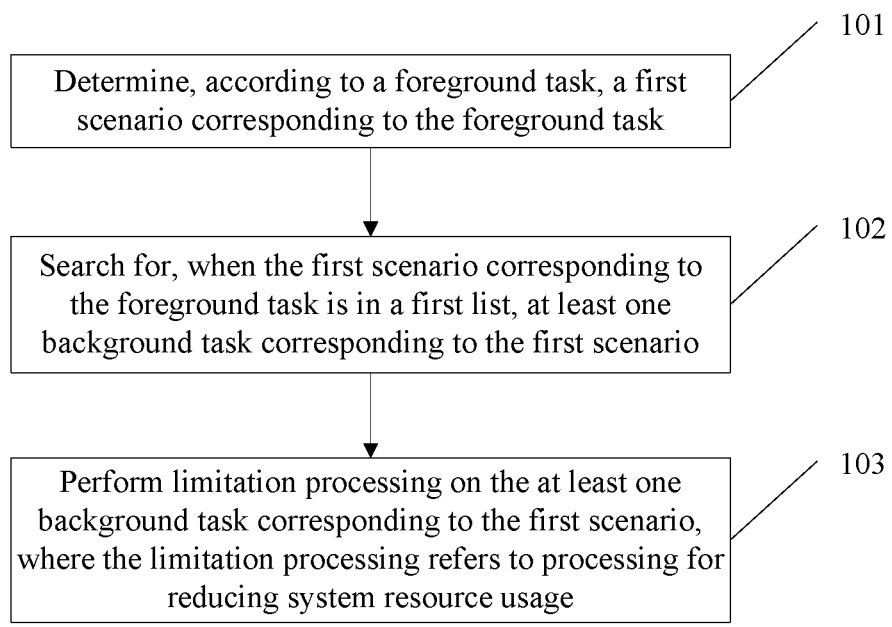
FIG. 1 is a schematic flowchart of a task management method according to an embodiment of the present disclosure.

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a first scenario and a second scenario are not limited to two scenarios. The first scenario may indicate one or more scenarios, and the second scenario may also indicate one or more scenarios. For example, the first scenario may be a scenario corresponding to a foreground task, and there may be one or more foreground tasks at the same time, that is, the first scenario may be one or more scenarios. The second scenario may be any one or more scenarios except the first scenario. For example, the second scenario may be a scenario corresponding to a task excluding a foreground task. Here, the first and the second are named only for distinguishing two different scenarios.

In addition, in the embodiments of the present disclosure, a scenario may refer to a status of an action of a device that implements the embodiments of the present disclosure. The status of the action of the device may refer to a status in which the device uses a system resource. The system resource may be a hardware resource, such as a central processing unit (CPU) resource or a memory resource, or the system resource may be a virtual resource, such as a network bandwidth resource or an operating system resource, which is not limited in the embodiments of the present disclosure. A scenario may be making a call, sending a short message service message, using a browser, playing a two dimensional (2D)/three dimensional (3D) game, viewing a main user interface, downloading a file, reading an electronic book (e-book), playing music, watching a video, navigating through a website, browsing a photo, taking a photo, making a video, sending an email, and the like.

In addition, in the embodiments of the present disclosure, a scenario corresponding to a task may be a scenario that a task enters when the task is executed. For example, when a music task is being executed, the task enters a music scenario and a download scenario, that is, a scenario corresponding to the music task may include the music scenario and the download scenario. In addition, a task corresponding to a scenario may be a task that enters the scenario. For example, when a music task is being executed, the task enters a download scenario. When a browser task is being executed, the task also enters the download scenario. When a software update task is being executed, the task also enters the download scenario. In this way, the tasks corresponding to the download scenario may include the music task, the browser task, and the software update task, that is, one scenario corresponds to different tasks.

In addition, in the embodiments of the present disclosure, a foreground task may refer to a task that requires user interaction, that is, an operation input by a user needs to be received during execution of the foreground task. Alternatively, a foreground task may refer to a task that is displayed on a screen. A background task may refer to a task that does not require user interaction during execution, that is, an operation input by a user does not need to be received during execution of the background task. Alternatively, a background task may refer to a task that is not displayed on a screen. In addition, it can be understood that a task may be a thread in the embodiments of the present disclosure.

Referring to FIG. 1, FIG. 1 is a schematic flowchart of a task management method according to an embodiment of the present disclosure. As shown in FIG. 1, the method includes the following steps.

Step 101: Determine, according to a foreground task, a first scenario corresponding to the foreground task.

Optionally, step 101 may be determining, when a current task is switched, a corresponding first scenario according to the current task. For example, when the current task, a music task, is being executed, the task enters a music scenario or a download scenario. In this way, it can be determined that the first scenario corresponding to the foreground task may be the music scenario, the download scenario, or the like. In addition, the foreground task may be one or multiple foreground tasks. In the case of multiple foreground tasks, step 101 may include determining, according to multiple foreground tasks, a first scenario corresponding to each foreground task. That is, step 101 may include determining, according to at least one foreground task, a first scenario corresponding to each foreground task.

Step 102: When the first scenario corresponding to the foreground task is in a first list, search for at least one background task corresponding to the first scenario, where the first list includes a scenario in which task limitation is allowed.

Optionally, the scenario in which task limitation is allowed and that is included in the first list may be a scenario that is set for receiving an operation input by a user. In this way, the scenario in which task limitation is allowed, and that is set according to the operation input by the user and meets the user's requirements or habits can be implemented. For example, a user likes to reduce power consumption of a device, and the user may set in the first list multiple scenarios in which task limitation is allowed, for example, setting a browser scenario, a game scenario, a navigation scenario, or the like as the scenario in which task limitation is allowed. In this way, when the first scenario corresponding to the current task is the browser scenario, the game scenario, or the navigation scenario, step 102 can be performed to reduce power consumption of the device.

Optionally, the scenario in which task limitation is allowed and that is included in the first list may be automatically set according to performance of a device. For example, when the device has better performance, for example, a CPU of the device is running at a high speed, the device has a larger memory, or the device has enough battery, only a few scenarios in which task limitation is allowed may be set in the first list. For example, when the device has poor performance, for example, the CPU of the device is running at a low speed, the device has a smaller memory, or the device does not have enough battery, more scenarios in which task limitation is allowed may be set in the first list. Because the first list has more scenarios in which task limitation is allowed, and step 102 and step 103 are performed multiple times, limitation processing can be performed on multiple background tasks in order to reduce power consumption of the device and ensure stable running of the device.

Optionally, the at least one background task corresponding to the first scenario may refer to at least one background task in all background tasks corresponding to the first scenario, or the at least one background task corresponding to the first scenario may refer to all background tasks corresponding to the first scenario. This embodiment sets no limit thereto.

Step 103: Perform limitation processing on the at least one background task corresponding to the first scenario, where the limitation processing refers to processing for reducing system resource usage.

Optionally, the limitation processing may be processing for reducing a system resource currently used by a task. For example, a quantity of system resources used by a background task A is A when step 101 is performed, and after the limitation processing is performed on the background task A, a quantity of system resources used by the background task A is B, where A is greater than B. In addition, B may be zero.

Optionally, the method may be further applied to any devices having a multi-task system, such as a tablet computer, a mobile phone, an e-reader, a remote control, a personal computer (PC), a notebook computer, an in-vehicle device, a web television (TV), a wearable device, or other intelligent devices having a network function.

In the foregoing technical solutions, a first scenario corresponding to a foreground task is determined according to the foreground task, and when the first scenario corresponding to the foreground task is in a first list, at least one background task corresponding to the first scenario is searched for, where the first list includes a scenario in which task limitation is allowed, and limitation processing is performed on the at least one background task corresponding to the first scenario, where the limitation processing refers to processing for reducing system resource usage. In this way, limitation processing is implemented on at least one background task corresponding to a scenario in which task limitation is allowed. Compared with the prior art in which a background task is always being executed, this embodiment of the present disclosure can reduce power consumption and power loss of a device.

Figure 2:
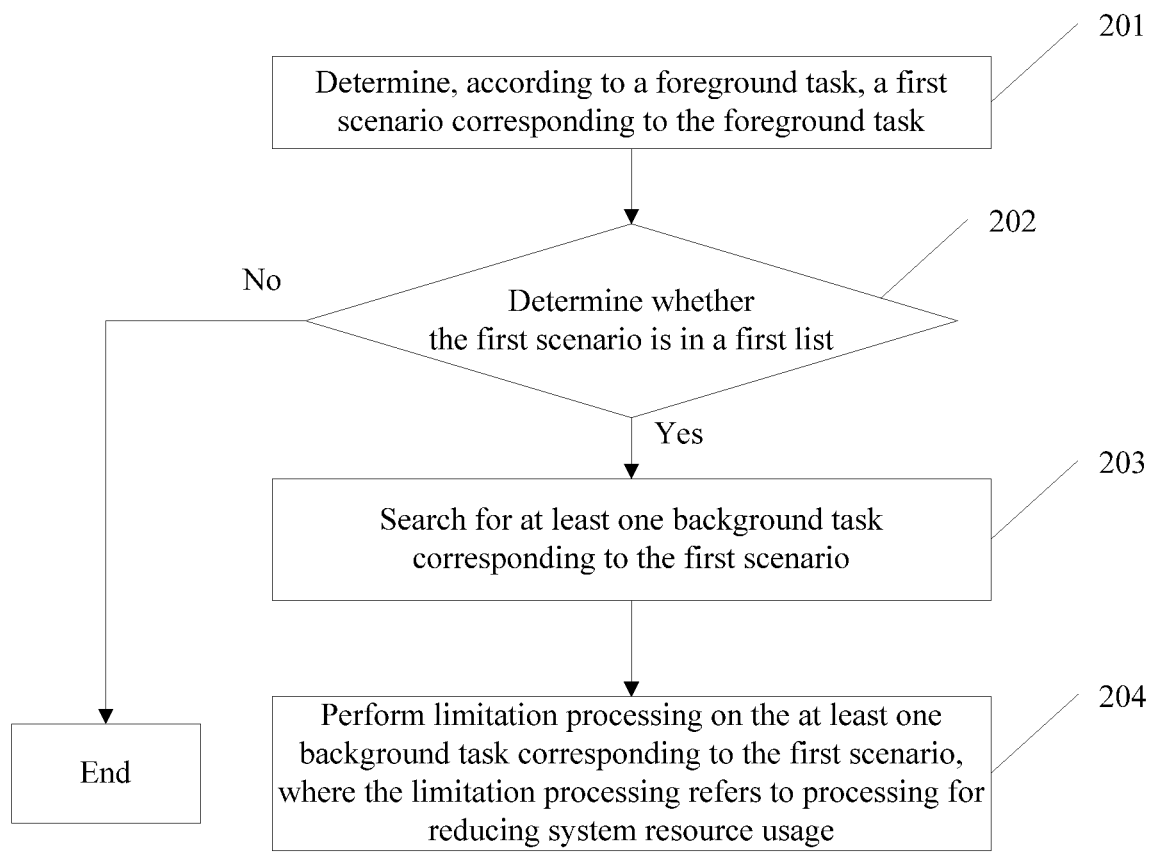
FIG. 2 is a schematic flowchart of another task management method according to an embodiment of the present disclosure.

Referring to FIG. 2, FIG. 2 is a schematic flowchart of another task management method according to an embodiment of the present disclosure. As shown in FIG. 2, the method includes the following steps.

Step 201: Determine, according to a foreground task, a first scenario corresponding to the foreground task.

Step 202: Determine whether the first scenario is in a first list. If yes, perform step 203. If no, end the process. The first list includes a scenario in which task limitation is allowed.

Step 203: Search for at least one background task corresponding to the first scenario.

Optionally, step 203 may be further searching for at least one background task that is in background tasks corresponding to the first scenario and that will not affect other tasks or an operating system after undergoing limitation processing, or searching for at least one pre-determined background task in background tasks corresponding to the first scenario, or searching for at least one background task that is in background tasks corresponding to the first scenario and whose user identifier corresponds to a common user. For example, step 203 may include searching for a user identifier of each background task corresponding to the first scenario, and searching for a background task whose user identifier (UID) corresponds to a common user as the at least one background task corresponding to the first scenario.

That is, this step is used to implement that the at least one background task that is corresponding to the first scenario and is searched for in step 203 is the background task whose UID corresponds to a common user. A UID is an inherent identifier of each task and is used to uniquely identify the task. In addition, a UID may correspond to a system user and a common user. When a UID of a background task corresponds to a system user, it indicates that the background task is a background task included in an operating system. When a UID of a background task corresponds to a common user, it indicates that the background task is not a background task included in an operating system.

Optionally, the method may further include ignoring a background task whose UID corresponds to a system user in the at least one background task corresponding to the first scenario. That is, processing is not performed on the background task whose UID corresponds to a system user.

Optionally, step 203 may be searching for at least one background task that is in background tasks corresponding to the first scenario and whose system resource usage reaches a preset threshold. For example, searching for at least one background task that is in the background tasks corresponding to the first scenario and whose CPU resource usage reaches 10% of CPU resources, or searching for at least one background task that is in the background tasks corresponding to the first scenario and whose sleep lock holding duration reaches 10 minutes, or searching for at least one background task that is in the background tasks corresponding to the first scenario and whose average data download speed reaches 10 million (M) per minute.

Step 204: Perform limitation processing on the at least one background task corresponding to the first scenario, where the limitation processing refers to processing for reducing system resource usage.

Figure 3:
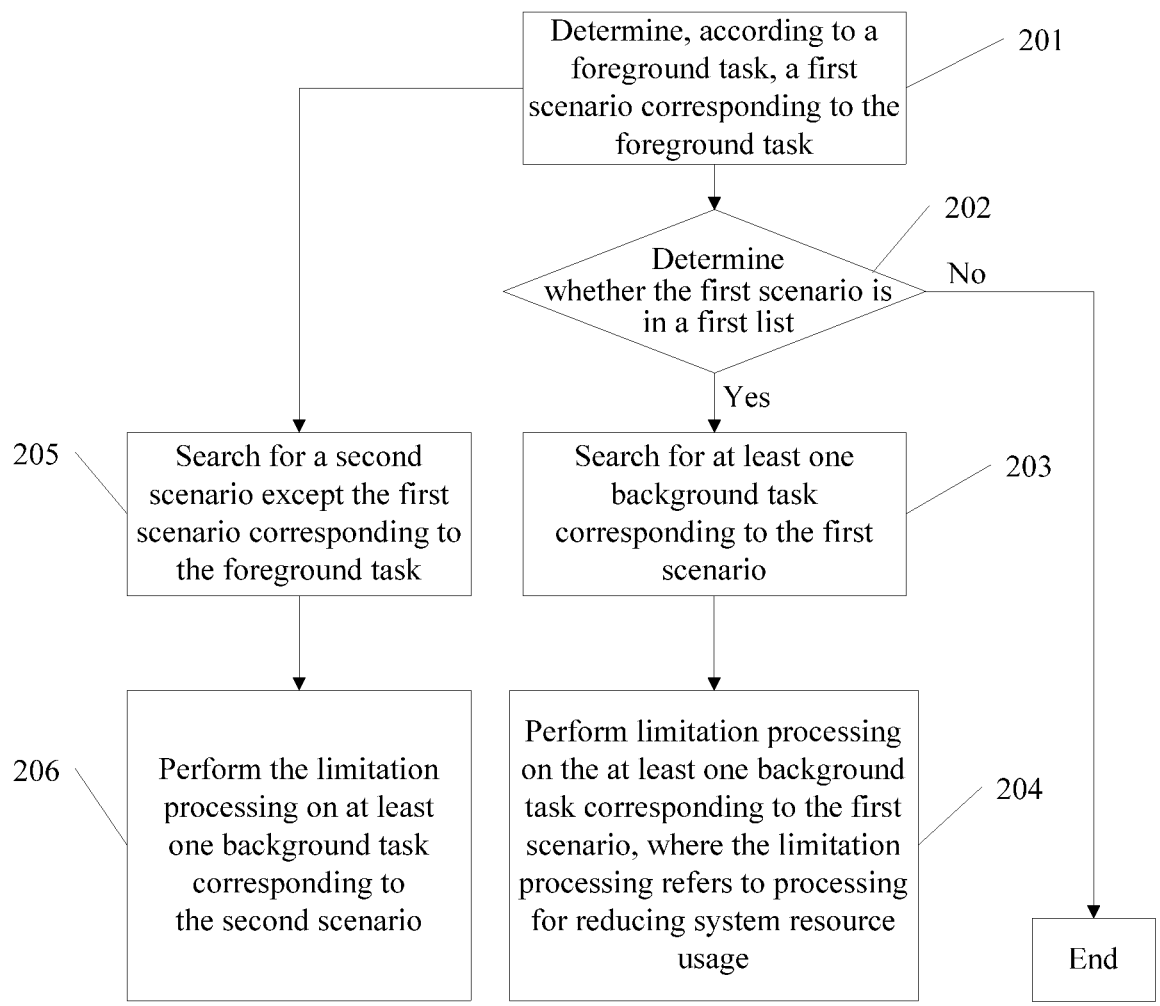
FIG. 3 is a schematic flowchart of another task management method according to an embodiment of the present disclosure.

Optionally, as shown in FIG. 3, the method may further include the following steps.

Step 205: Search for a second scenario except the first scenario corresponding to the foreground task, where the second scenario corresponds to at least one background task, and the first list includes the second scenario.

Step 206: Perform the limitation processing on the at least one background task corresponding to the second scenario.

Optionally, the second scenario may refer to one or more scenarios. In addition, the second scenario may refer to all scenarios except the first scenario, or one or more scenarios except the first scenario, which is not limited in this embodiment.

In addition, the at least one background task corresponding to the second scenario may refer to at least one background task in all background tasks corresponding to the second scenario, or the at least one background task corresponding to the second scenario may refer to all background tasks corresponding to the second scenario. This embodiment sets no limit thereto. In addition, the second scenario may be a pre-determined scenario, for example, a scenario that is set for receiving an operation input by a user. In this way, the scenario in which task limitation is allowed, and that is set according to the operation input by the user and meets the user's requirements or habits can be implemented. In addition, step 205 may be searching for at least one background task that is in the background tasks corresponding to the second scenario and will not affect other tasks or an operating system after undergoing limitation processing, or searching for at least one pre-determined background task in the background tasks corresponding to the second scenario, or searching for at least one background task that is in the background tasks corresponding to the second scenario and whose user identifier corresponds to a common user.

Optionally, the second scenario may be a scenario except the first scenario and not in a second list, where the second list may include a scenario in which task limitation is prohibited. The scenario in which task limitation is prohibited may be a scenario that is set for receiving an operation input by a user. In this way, the scenario in which task limitation is prohibited, and that is set according to the operation input by the user and meets the user's requirements or habits can be implemented. For example, the user may set, in the second list, a scenario that requires user attention as the scenario in which task limitation is prohibited, for example, a short message service message scenario, a call scenario, and a download scenario. Alternatively, the scenario in which task limitation is prohibited may be automatically set according to performance of a device. For example, when the device has better performance, for example, a CPU of the device is running at a high speed, the device has a larger memory, or the device has enough battery, more scenarios in which task limitation is prohibited may be set in the second list. For example, when the device has poor performance, for example, the CPU of the device is running at a low speed, the device has a smaller memory, or the device does not have enough battery, only a few scenarios in which task limitation is prohibited may be set in the second list.

Optionally, before step 204, the method may further include querying a UID of the at least one background task corresponding to the first scenario, ignoring the at least one background task if the UID of the at least one background task corresponding to the first scenario corresponds to a system user, and performing the limitation processing on the at least one background task if the UID of the at least one background task corresponds to a common user. That is, step 204 is performing the limitation processing on the at least one background task whose UID corresponds to a common user.

In this implementation manner, because the background task whose UID corresponds to a common user is not a task of an operating system, other tasks are not affected after limitation processing is performed on the background task Therefore, limitation processing is performed only on a background task whose UID corresponds to a common user in step 204, which can reduce power consumption and power loss of the device without affecting other tasks.

Optionally, before step 204, the method may further include starting a timer for the at least one background task corresponding to the first scenario, and stopping, when the timer exceeds a preset threshold, a system component used by the at least one background task corresponding to the first scenario.

Optionally, the system component includes but is not limited to a timer, a sleep lock, and broadcast notification. Meanwhile, a status value of the system component when the system component is paused may be saved in the foregoing step such that the background task can call the saved status value of the system component after the limitation processing is released. In addition, the system component used by the at least one background task corresponding to the first scenario is stopped only when the timer reaches the preset threshold (for example, 10 second (s), 30 s, or the like). This may avoid frequently stopping the system component used by the at least one background task corresponding to the first scenario.

Optionally, before step 204, the method may further include querying whether the at least one background task corresponding to the first scenario uses a system component, and stopping the system component if the at least one background task corresponding to the first scenario uses the system component.

In this implementation manner, because the system component used by the at least one background task corresponding to the first scenario is stopped, power consumption and power loss of the device may also be reduced.

Optionally, the processing for reducing system resource usage may include at least one of the following manners: freezing the at least one background task, stopping the at least one background task, and limiting a system resource used by the at least one background task.

In this case, step 204 may be freezing the at least one background task corresponding to the first scenario, or stopping the at least one background task corresponding to the first scenario, or limiting a system resource used by the at least one background task corresponding to the first scenario.

Optionally, freezing the at least one background task corresponding to the first scenario may be prohibiting the background task from calling a system resource, for example, prohibiting a CPU from calling the at least one background task corresponding to the first scenario. Furthermore, a task scheduler of an operating system is used to prohibit the at least one background task corresponding to the first scenario from participating in any scheduling. Because the at least one background task corresponding to the first scenario is prohibited from calling the system resource, power consumption of the device is reduced.

Optionally, limiting a system resource used by the at least one background task corresponding to the first scenario may be limiting a time within which the CPU calls the at least one background task corresponding to the first scenario. For example, a time value for CPU calling is set for the at least one background task corresponding to the first scenario such that the CPU can call the at least one background task corresponding to the first scenario within a time indicated by the time value. In addition, the limiting a system resource used by the at least one background task corresponding to the first scenario may further be limiting use of the system resource by the at least one background task corresponding to the first scenario. For example, limiting use of a network bandwidth by the at least one background task corresponding to the first scenario or limiting use of memory space by the at least one background task corresponding to the first scenario. In addition, it may further be using different limitation measures depending on different scenarios corresponding to the at least one background task corresponding to the first scenario. Because use of the system resource by the at least one background task corresponding to the first scenario is limited in the foregoing step, power consumption of the device is reduced.

Optionally, step 201 may further include determining, according to the foreground task, a first scenario corresponding to the foreground task when a temperature reaches a preset temperature threshold.

The temperature may be a temperature of the device that implements this embodiment, where the temperature of the device may further refer to a temperature of the CPU of the device or a temperature of a modem of the device.

In this implementation manner, it may be implemented that limitation processing is performed on the background task only when the temperature of the device reaches the preset temperature threshold.

Optionally, the method may further include releasing the limitation processing on the at least one background task corresponding to the first scenario. Furthermore, when the first scenario is not in the first list, the limitation processing is released for the background task that has undergone the limitation processing.

Optionally, the method may be further applied to any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solution, multiple optional implementation manners are implemented on the basis of the first embodiment, all of which can reduce power consumption and power loss of a device.

Figure 4:
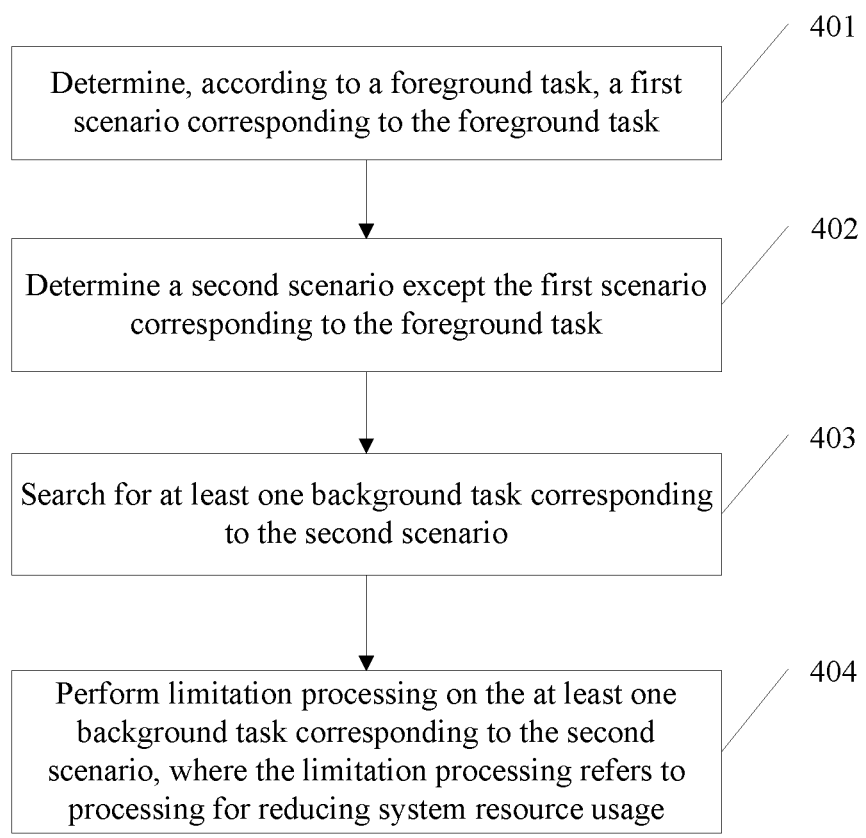
FIG. 4 is a schematic flowchart of another task management method according to an embodiment of the present disclosure.

Referring to FIG. 4, FIG. 4 is a schematic flowchart of another task management method according to an embodiment of the present disclosure. As shown in FIG. 4, the method includes the following steps.

Step 401: Determine, according to a foreground task, a first scenario corresponding to the foreground task.

Optionally, step 401 may further be determining, when a current task is switched, a corresponding first scenario according to the current task. For example, when the current task, a music task, is being executed, the task enters a music scenario or a download scenario. In this way, it can be determined that the first scenario corresponding to the foreground task may be the music scenario or the download scenario, or the like. In addition, the foreground task may be one or multiple foreground tasks. In the case of multiple foreground tasks, step 401 may include determining, according to multiple foreground tasks, a first scenario corresponding to each foreground task. That is, step 401 may include determining, according to at least one foreground task, a first scenario corresponding to each foreground task.

Step 402: Determine a second scenario except the first scenario corresponding to the foreground task, where the second scenario is a scenario in which task limitation is allowed and the second scenario corresponds to at least one background task.

Optionally, the second scenario may refer to one or more scenarios. In addition, the second scenario may refer to all scenarios except the first scenario, or one or more scenarios except the first scenario, which is not limited in this embodiment. In addition, the second scenario may be a pre-determined scenario, for example, a scenario that is set for receiving an operation input by a user. In this way, the scenario in which task limitation is allowed, and that is set according to the operation input by the user and meets the user's requirements or habits can be implemented.

Optionally, the second scenario may be a scenario except the first scenario and not in a second list, where the second list may include a scenario in which task limitation is prohibited.

Step 403: Search for the at least one background task corresponding to the second scenario.

Optionally, the at least one background task corresponding to the second scenario may refer to at least one background task in all background tasks corresponding to the second scenario, or the at least one background task corresponding to the second scenario may refer to all background tasks corresponding to the second scenario. In addition, step 403 may be searching for at least two background tasks that are in the background tasks corresponding to the second scenario and that will not affect other tasks or an operating system after undergoing limitation processing, or searching for at least one pre-determined background task in the background tasks corresponding to the second scenario, or searching for at least one background task that is in the background tasks corresponding to the second scenario and whose UID corresponds to a common user. For example, step 403 may include searching for a UID of each background task corresponding to the second scenario, and searching for a background task whose UID corresponds to a common user as the at least one background task corresponding to the second scenario.

That is, this step is used to implement that the at least one background task that is corresponding to the second scenario and is searched for in step 403 is the background task whose UID corresponds to a common user.

Optionally, the method may further include ignoring a background task whose UID corresponds to a system user in the at least one background task corresponding to the second scenario. That is, processing is not performed on the background task whose UID corresponds to a system user.

Optionally, step 403 may be searching for at least one background task whose system resource usage reaches a preset threshold in the background tasks corresponding to the second scenario.

Step 404: Perform limitation processing on the at least one background task corresponding to the second scenario, where the limitation processing refers to processing for reducing system resource usage.

Figure 5:
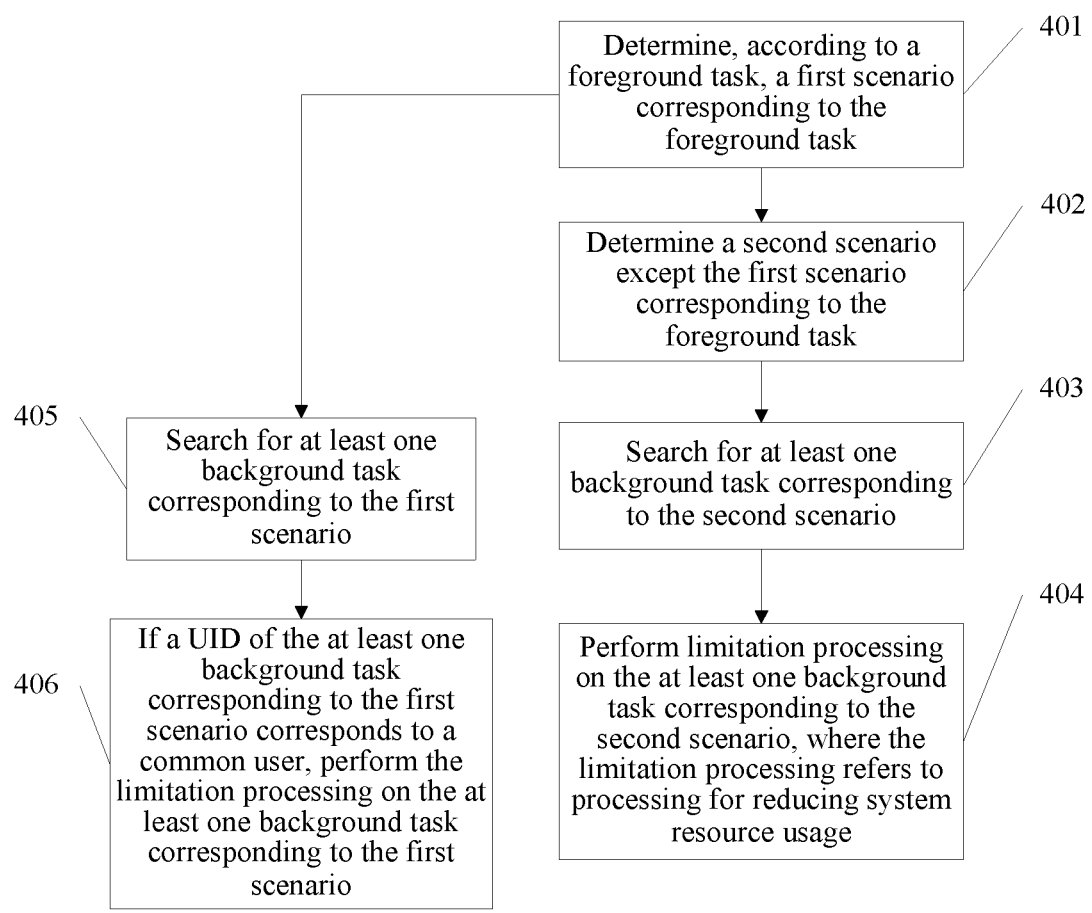
FIG. 5 is a schematic flowchart of another task management method according to an embodiment of the present disclosure.

Optionally, as shown in FIG. 5, the method may further include the following steps.

Step 405: Search for at least one background task corresponding to the first scenario.

Step 406: If a UID of the at least one background task corresponding to the first scenario corresponds to a common user, perform the limitation processing on the at least one background task corresponding to the first scenario.

For this implementation manner of this embodiment, further refer to the implementation manner in which the limitation processing is performed on the at least one background task corresponding to the first scenario in the first and second embodiments, which is not repeatedly described here.

Optionally, before step 404, the method may further include starting a timer for the at least one background task corresponding to the second scenario, and stopping, when the timer exceeds a preset threshold, a system component used by the at least one background task corresponding to the second scenario.

Optionally, the system component includes but is not limited to a timer, a sleep lock, and broadcast notification. Meanwhile, a status value of the system component when the system component is paused may be saved in the foregoing step such that the background task can call the saved status value of the system component after the limitation processing is released. In addition, the system component used by the at least one background task corresponding to the second scenario is stopped only when the timer reaches the preset threshold (for example, 10 s, 30 s, or the like). This may avoid frequently stopping the system component used by the at least one background task corresponding to the second scenario.

Optionally, before step 404, the method may further include querying whether the at least one background task uses a system component, and stopping the system component if the at least one background task uses the system component.

In this implementation manner, because the system component used by the at least one background task corresponding to the second scenario is stopped, power consumption and power loss of the device may be reduced.

Optionally, the processing for reducing system resource usage includes at least one of the following manners: freezing the at least one background task, stopping the at least one background task, and limiting a system resource used by the at least one background task.

In this case, step 404 may be freezing the at least one background task corresponding to the second scenario, stopping the at least one background task corresponding to the second scenario, or limiting a system resource used by the at least one background task corresponding to the second scenario.

Optionally, freezing the at least one background task corresponding to the second scenario may be prohibiting the background task from calling a system resource, for example, prohibiting a CPU from calling the at least one background task corresponding to the first scenario. Furthermore, a task scheduler of an operating system is used to prohibit the at least one background task corresponding to the first scenario from participating in any scheduling. Because the at least one background task corresponding to the second scenario is prohibited from calling the system resource, power consumption of the device is reduced.

Optionally, limiting a system resource used by the at least one background task corresponding to the second scenario may be limiting a time within which the CPU calls the at least one background task corresponding to the second scenario. For example, a time value for CPU calling is set for the at least one background task corresponding to the second scenario such that the CPU can call the at least one background task corresponding to the second scenario within a time indicated by the time value. In addition, limiting a system resource used by the at least one background task corresponding to the second scenario may further be limiting use of the system resource by the at least one background task corresponding to the second scenario. For example, limiting use of a network bandwidth by the at least one background task corresponding to the second scenario or limiting use of memory space by the at least one background task corresponding to the second scenario. In addition, it may further be using different limitation measures depending on different scenarios corresponding to the at least one background task corresponding to the second scenario. Because use of the system resource by the at least one background task corresponding to the second scenario is limited in the foregoing step, power consumption of the device is reduced.

Optionally, the method may be further applied to any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solution, a first scenario corresponding to a foreground task is determined according to the foreground task. A second scenario except the first scenario corresponding to the foreground task is determined, where the second scenario is a scenario in which task limitation is allowed and the second scenario corresponds to at least one background task. The at least one background task corresponding to the second scenario is searched for, and limitation processing is performed on the at least one background task corresponding to the second scenario, where the limitation processing refers to processing for reducing system resource usage. Therefore, power consumption and power loss of a device can be reduced.

Figure 6:
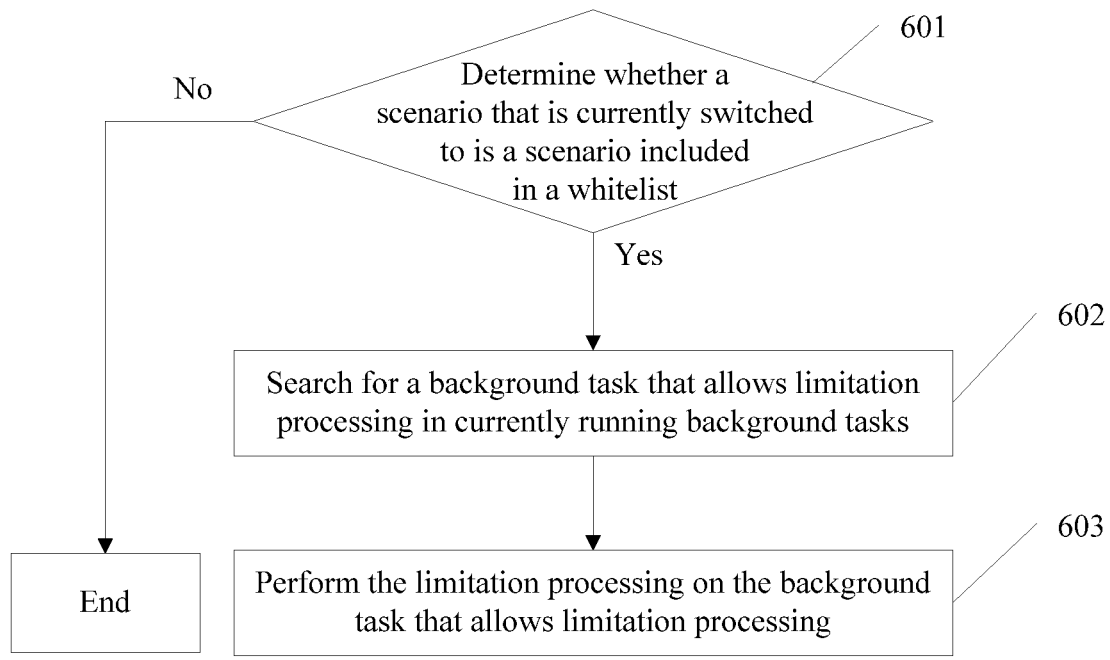
FIG. 6 is a schematic flowchart of another task management method according to an embodiment of the present disclosure.

Referring to FIG. 6, FIG. 6 is a schematic flowchart of a task management method according to an embodiment of the present disclosure. As shown in FIG. 6, the method includes the following steps.

Step 601: Determine whether a scenario that is currently switched to is a scenario included in a whitelist. If yes, perform step 602. If no, end the process. The whitelist is a preset list including at least one scenario in which background task limitation is allowed.

Optionally, the foregoing scenario may be a status of an action of a device that implements step 601. The status of the action of the device may refer to a status in which the device uses a system resource. The system resource may be a hardware resource, for example, a CPU resource or a memory resource, or the system resource may be a virtual resource, for example, a network bandwidth resource or an operating system resource, which is not limited in the embodiments of the present disclosure. A scenario may be making a call, sending a short message service message, using a browser, playing a 2D/3D game, viewing a main user interface, downloading a file, reading an e-book, playing music, watching a video, navigating through a website, browsing a photo, taking a photo, making a video, sending an electronic mail (e-mail), and the like. In addition, the scenario that is currently switched to may be one or more scenarios. In addition, scenario switching may be switching generated by a switching time of a foreground task. For example, when a foreground task is started, one or more scenarios are switched to. For example, when a task of making a call is started, the device switches to a scenario of making a call. When a music task is started, the device switches to a music playing scenario and a music download scenario, and when a game task is started, the device switches to a game scenario and an Internet access scenario. For example, when a foreground task is stopped, the device switches to one or more scenarios. For example, when a game task is stopped, the device switches from a game scenario to a main user interface scenario.

Optionally, the scenario in which background task limitation is allowed may be a scenario that is set for receiving an operation input by a user. In this way, the scenario in which background task limitation is allowed, and that is set according to the operation input by the user and meets the user's requirements or habits can be implemented. For example, a user likes to reduce power consumption of a device, and the user may set in the whitelist multiple scenarios in which background task limitation is allowed, for example, setting a browser scenario, a game scenario, a navigation scenario, or the like as the scenario in which background task limitation is allowed. In this way, when a current scenario of the device is the browser scenario, the game scenario, or the navigation scenario, step 602 can be performed to reduce power consumption of the device.

Optionally, the scenario in which background task limitation is allowed may be automatically set according to performance of the device. For example, when the device has better performance, for example, a CPU of the device is running at a high speed, the device has a larger memory, or the device has enough battery, only a few scenarios in which background task limitation is allowed may be set in the whitelist. For example, when the device has poor performance, for example, the CPU of the device is running at a low speed, the device has a smaller memory, or the device does not have enough battery, more scenarios in which background task limitation is allowed may be set in the whitelist. Because the whitelist has more scenarios in which background task limitation is allowed, and step 602 and step 603 are performed multiple times, limitation processing can be performed on multiple background tasks that allow limitation processing in order to reduce power consumption of the device and ensure stable running of the device.

Step 602: Search for a background task that allows limitation processing in currently running background tasks when the scenario that is currently switched to is the scenario included in the whitelist, where the limitation processing refers to processing for reducing system resource usage.

Optionally, the background task that allows limitation processing may be further a background task that will not affect other tasks (such as a foreground task) or an operating system after undergoing the limitation processing, or the background task that allows limitation processing may be a pre-determined background task, or the background task that allows limitation processing may be a background task that meets a specific condition.

Optionally, the limitation processing may be an operation used to reduce a system resource currently used by a task. For example, a quantity of system resources used by a background task A is A when step 602 is performed, and after the limitation processing is performed on the background task A, a quantity of system resources used by the background task A is B, where A is greater than B. In addition, B may be zero.

Step 603: Perform the limitation processing on the background task that allows limitation processing.

Optionally, the method may be applied to any devices having a multi-task system, such as a tablet computer, a mobile phone, an e-reader, a remote control, a PC, a notebook computer, an in-vehicle device, a web TV, a wearable device, or other intelligent devices having a network function.

It should be noted that, the scenario in this embodiment may be equivalent to the scenario in the foregoing embodiments. In addition, the whitelist in this embodiment may be the first list in the foregoing embodiments.

In the foregoing technical solution, whether a scenario that is currently switched to is a scenario included in a whitelist is determined, where the whitelist is a preset list including at least one scenario in which background task limitation is allowed. When it is determined that the scenario that is currently switched to is the scenario included in the whitelist, a background task that allows limitation processing is searched for in currently running background tasks, where the limitation processing refers to processing for reducing system resource usage, and the limitation processing is performed on the background task that allows limitation processing. In this way, limitation processing is implemented on a background task that allows limitation processing. Compared with the prior art in which a background task is always being executed, this embodiment of the present disclosure can reduce power consumption and power loss of a device.

Figure 7:
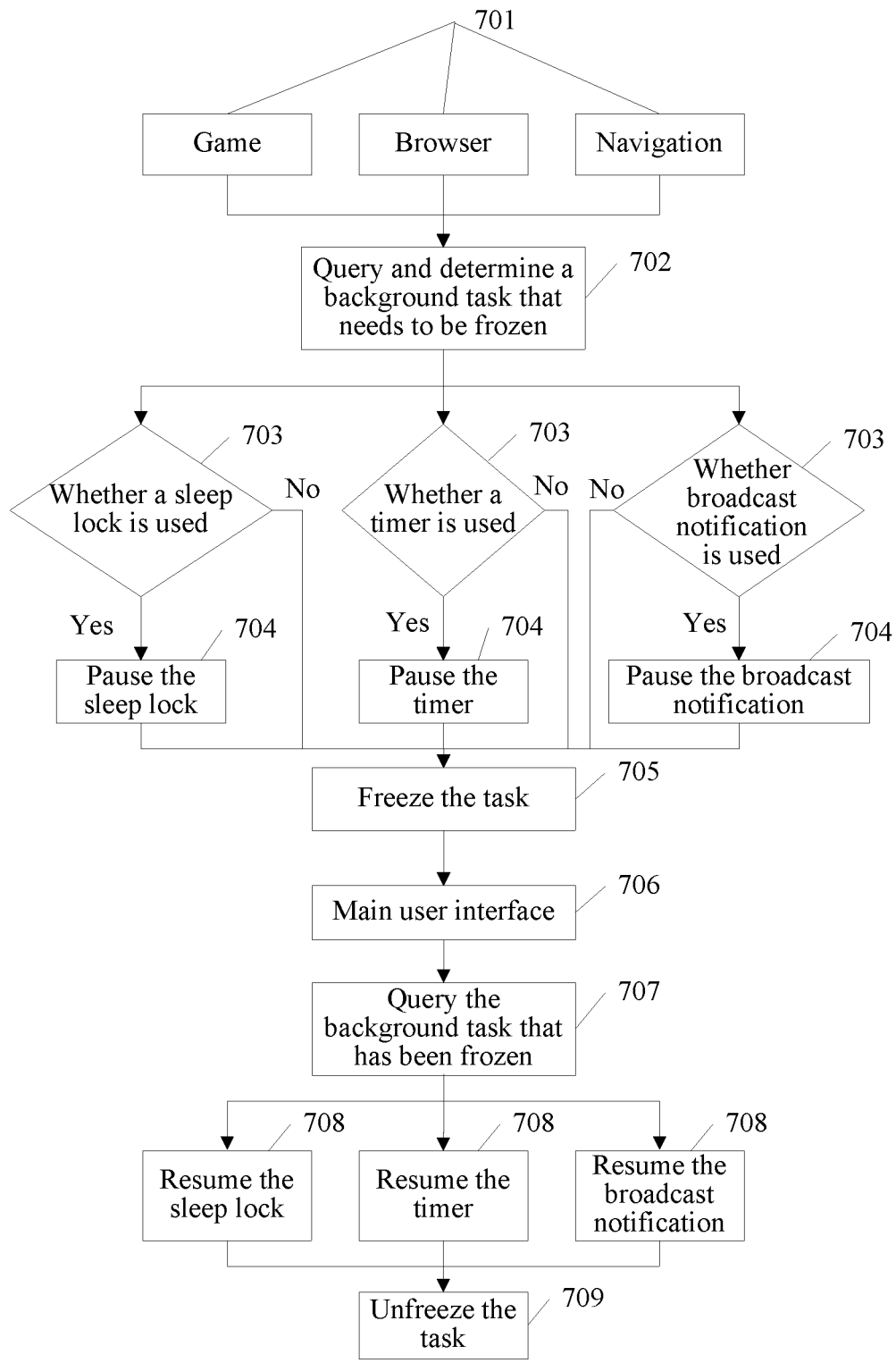
FIG. 7 is a schematic diagram of another task management method according to an embodiment of the present disclosure.

Referring to FIG. 7, FIG. 7 is a schematic diagram of another task management method according to an embodiment of the present disclosure. As shown in FIG. 7, the method includes the following steps.

Step 701: Detect that a device enters a game scenario, a browser scenario, or a navigation scenario, where the game scenario, the browser scenario, and the navigation scenario are only examples, and this embodiment includes but is not limited to these scenarios, for example, may also include an audio playing or video playing scenario.

Step 702: Query and determine a background task that needs to be frozen.

Step 703: Determine whether the background task that needs to be frozen uses a system component. If yes, perform step 704. If no, perform step 705. Step 703 may include determining whether the background task that needs to be frozen uses a sleep lock, and/or determining whether the background task that needs to be frozen uses a timer, and/or determining whether the background task that needs to be frozen uses broadcast notification.

Step 704: Pause the system component, where step 704 may include pausing the sleep lock if the background task that needs to be frozen uses a sleep lock, pausing the timer if the background task that needs to be frozen uses a timer, pausing the broadcast notification if the background task that needs to be frozen uses broadcast notification.

Step 705: Freeze the background task that needs to be frozen.

The task management method may further include the following steps.

Step 706: Detect that the device switches to a main user interface scenario.

Step 707: Query the background task that has been frozen.

Step 708: Resume the system component for the background task that has been frozen, where step 708 may include resuming the sleep lock, resuming the timer, and resuming the broadcast notification.

Step 709: Unfreeze the background task that has been frozen.

The following describes apparatus embodiments of the present disclosure. The apparatus embodiments of the present disclosure are used to execute the methods implemented in the first embodiment to the fifth embodiment of the present disclosure. For ease of description, the following describes only the part related to the embodiments of the present disclosure. For specific technology details that are not disclosed, refer to the first embodiment, the second embodiment, the third embodiment, the fourth embodiment, and the fifth embodiment of the present disclosure.

Figure 8:
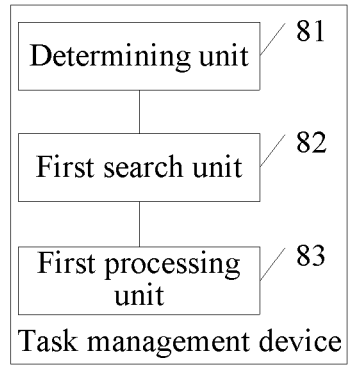
FIG. 8 is a schematic diagram of a structure of a task management device according to an embodiment of the present disclosure.

Referring to FIG. 8, FIG. 8 is a schematic diagram of a structure of a task management device according to an embodiment of the present disclosure. As shown in FIG. 8, the task management device includes a determining unit 81, a first search unit 82, and a first processing unit 83.

The determining unit 81 is configured to determine, according to a foreground task, a first scenario corresponding to the foreground task.

Optionally, the determining unit 81 may further determine a corresponding first scenario according to the current task when a current task is switched. For example, when the current task, a music task, is being executed, the task enters a music scenario or a download scenario. In this way, it can be determined that the first scenario corresponding to the foreground task may be the music scenario or the download scenario, or the like. In addition, the foreground task may be one or multiple foreground tasks. In the case of multiple foreground tasks, the determining unit 81 may be configured to determine, according to multiple foreground tasks, a first scenario corresponding to each foreground task. That is, the determining unit 81 may determine, according to at least one foreground task, a first scenario corresponding to each foreground task.

The first search unit 82 is configured to search for, when the first scenario that corresponds to the foreground task and is determined by the determining unit 81 is in a first list, at least one background task corresponding to the first scenario, where the first list includes a scenario in which task limitation is allowed.

Optionally, the scenario in which task limitation is allowed and that is included in the first list may be a scenario that is set for receiving an operation input by a user. In this way, the scenario in which task limitation is allowed, and that is set according to the operation input by the user and meets the user's requirements or habits can be implemented. For example, a user likes to reduce power consumption of a device, and the user may set in the first list multiple scenarios in which task limitation is allowed, for example, setting a browser scenario, a game scenario, a navigation scenario, or the like as the scenario in which task limitation is allowed. In this way, when the first scenario corresponding to the current task is the browser scenario, the game scenario, or the navigation scenario, the first search unit 82 can perform a search action to reduce power consumption of the device.

Optionally, the scenario in which task limitation is allowed and that is included in the first list may be automatically set according to performance of a device. For example, when the device has better performance, for example, a CPU of the device is running at a high speed, the device has a larger memory, or the device has enough battery, only a few scenarios in which task limitation is allowed may be set in the first list. For example, when the device has poor performance, for example, the CPU of the device is running at a low speed, the device has a smaller memory, or the device does not have enough battery, more scenarios in which task limitation is allowed may be set in the first list. In this way, power consumption of the device can be reduced.

Optionally, the at least one background task corresponding to the first scenario may refer to at least one background task in all background tasks corresponding to the first scenario, or the at least one background task corresponding to the first scenario may refer to all background tasks corresponding to the first scenario. This embodiment sets no limit thereto.

The first processing unit 83 is configured to perform limitation processing on the at least one background task that corresponds to the first scenario and is searched for by the first search unit 82, where the limitation processing refers to processing for reducing system resource usage.

Optionally, the limitation processing may be processing for reducing a system resource currently used by a task.

Optionally, the device may be any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solutions, a first scenario corresponding to a foreground task is determined according to the foreground task, and when the first scenario corresponding to the foreground task is in a first list, at least one background task corresponding to the first scenario is searched for, where the first list includes a scenario in which task limitation is allowed, and limitation processing is performed on the at least one background task corresponding to the first scenario, where the limitation processing refers to processing for reducing system resource usage. In this way, limitation processing is implemented on at least one background task corresponding to a scenario in which task limitation is allowed. Compared with the prior art in which a background task is always being executed, the embodiments of the present disclosure can reduce power consumption and power loss of a device.

Figure 9:
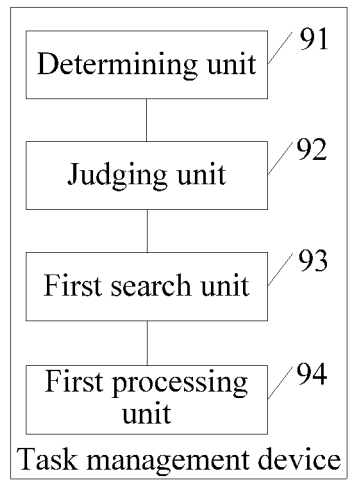
FIG. 9 is a schematic diagram of a structure of another task management device according to an embodiment of the present disclosure.

Referring to FIG. 9, FIG. 9 is a schematic diagram of a structure of a task management device according to an embodiment of the present disclosure. As shown in FIG. 9, the task management device includes a determining unit 91, a judging unit 92, a first search unit 93, and a first processing unit 94.

The determining unit 91 is configured to determine, according to a foreground task, a first scenario corresponding to the foreground task.

The judging unit 92 is configured to determine whether the first scenario that is determined by the determining unit 91 is in a first list, where the first list includes a scenario in which task limitation is allowed.

The first search unit 93 is configured to search for, when the judging unit 92 determines that the first scenario that is determined by the determining unit 91 is in the first list, at least one background task corresponding to the first scenario.

Optionally, the first search unit 93 may further search for at least one background task that is in background tasks corresponding to the first scenario and that will not affect other tasks or an operating system after undergoing limitation processing, or search for at least one pre-determined background task in background tasks corresponding to the first scenario, or search for at least one background task that is in background tasks corresponding to the first scenario and whose user identifier corresponds to a common user. For example, a UID of each background task corresponding to the first scenario is searched for, and a background task whose UID corresponds to a common user is searched for and used as the at least one background task corresponding to the first scenario.

In this way, it can be implemented that the at least one background task that is corresponding to the first scenario and is searched for by the first search unit 93 is the background task whose UID corresponds to a common user. A UID is an inherent identifier of each task and may be used to uniquely identify the task. In addition, a UID may correspond to a system user and a common user. When a UID of a background task corresponds to a system user, it indicates that the background task is a background task included in an operating system. When a UID of a background task corresponds to a common user, it indicates that the background task is not a background task included in an operating system.

Optionally, the device may be further configured to ignore a background task that is in the at least one background task corresponding to the first scenario and whose UID corresponds to a system user. That is, processing is not performed on the background task whose UID corresponds to a system user.

Optionally, the first search unit 93 may search for at least one background task that is in background tasks corresponding to the first scenario and whose system resource usage reaches a preset threshold. For example, at least one background task that is in the background tasks corresponding to the first scenario and whose CPU resource usage reaches 10% of CPU resources is searched for, or at least one background task that is in the background tasks corresponding to the first scenario and whose sleep lock holding duration reaches 10 minutes is searched for, or at least one background task that is in the background tasks corresponding to the first scenario and whose average data download speed reaches 10M per minute is searched for.

The first processing unit 94 is configured to perform limitation processing on the at least one background task that corresponds to the first scenario and is searched for by the first search unit 93, where the limitation processing refers to processing for reducing system resource usage.

Figure 10:
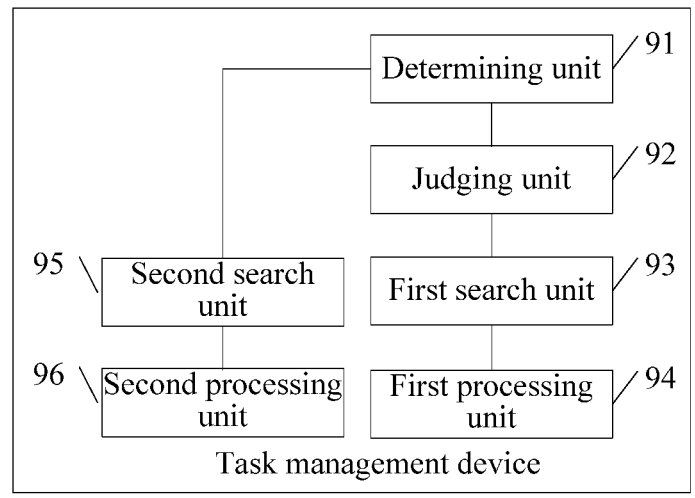
FIG. 10 is a schematic diagram of a structure of another task management device according to an embodiment of the present disclosure.

Optionally, as shown in FIG. 10, the device may further include a second search unit 95 configured to search for a second scenario except the first scenario that corresponds to the foreground task and is searched for by the determining unit 91, where the second scenario corresponds to at least one background task, and the first list includes the second scenario, and a second processing unit 96 configured to perform the limitation processing on the at least one background task that corresponds to the second scenario and is searched for by the second search unit 95.

Optionally, the second scenario may refer to one or more scenarios. In addition, the second scenario may refer to all scenarios except the first scenario, or one or more scenarios except the first scenario, which is not limited in this embodiment.

In addition, the at least one background task corresponding to the second scenario may refer to at least one background task in all background tasks corresponding to the second scenario, or the at least one background task corresponding to the second scenario may refer to all background tasks corresponding to the second scenario. This embodiment sets no limit thereto. In addition, the second scenario may be a pre-determined scenario, for example, a scenario that is set for receiving an operation input by a user. In this way, the scenario in which task limitation is allowed, and that is set according to the operation input by the user and meets the user's requirements or habits can be implemented. In addition, the second search unit 95 may further search for at least one background task that is in the background tasks corresponding to the second scenario and will not affect other tasks or an operating system after undergoing limitation processing, or search for at least one pre-determined background task in the background tasks corresponding to the second scenario, or search for at least one background task that is in the background tasks corresponding to the second scenario and whose user identifier corresponds to a common user.

Optionally, the second scenario may be a scenario except the first scenario and not in a second list, where the second list may include a scenario in which task limitation is prohibited. The scenario in which task limitation is prohibited may be a scenario that is set for receiving an operation input by a user. In this way, the scenario in which task limitation is prohibited, and that is set according to the operation input by the user, and meets the user's requirements or habits can be implemented. For example, the user may set, in the second list, a scenario that requires user attention as the scenario in which task limitation is prohibited, for example, a short message service message scenario, a call scenario, and a download scenario. Alternatively, the scenario in which task limitation is prohibited may be automatically set according to performance of a device. For example, when the device has better performance, for example, a CPU of the device is running at a high speed, the device has a larger memory, or the device has enough battery, more scenarios in which task limitation is prohibited may be set in the second list. For example, when the device has poor performance, for example, the CPU of the device is running at a low speed, the device has a smaller memory, or the device does not have enough battery, only a few scenarios in which task limitation is prohibited may be set in the second list.

Figure 11:
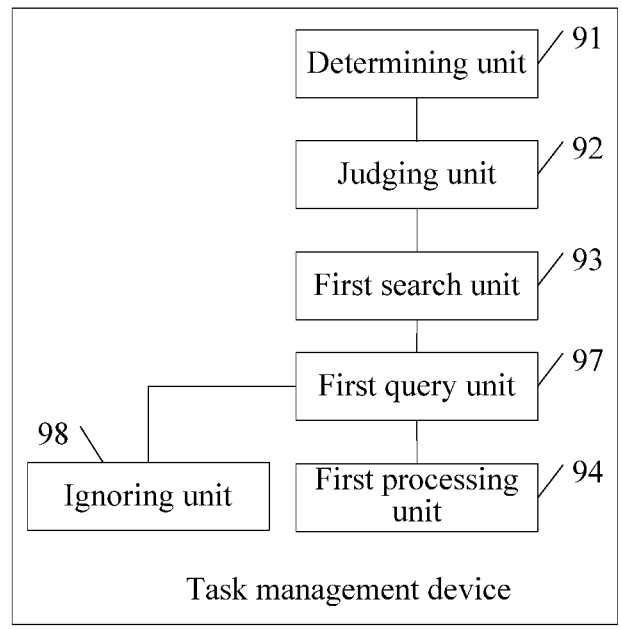
FIG. 11 is a schematic diagram of a structure of another task management device according to an embodiment of the present disclosure.

Optionally, as shown in FIG. 11, the device may further include a first query unit 97 configured to query a UID of the at least one background task, and an ignoring unit 98 configured to ignore the at least one background task if the UID that is of the at least one background task and queried by the first query unit 97 corresponds to a system user, where the first processing unit 94 may be configured to perform the limitation processing on the at least one background task if the user identifier that is of the at least one background task and queried by the first query unit 97 corresponds to a common user.

In this implementation manner, because the background task whose UID corresponds to a common user is not a task of an operating system, other tasks are not affected after limitation processing is performed on these background tasks. Therefore, the first processing unit 94 limits only a background task whose UID corresponds to a common user, which can reduce power consumption and power loss of the device without affecting other tasks.

Figure 12:
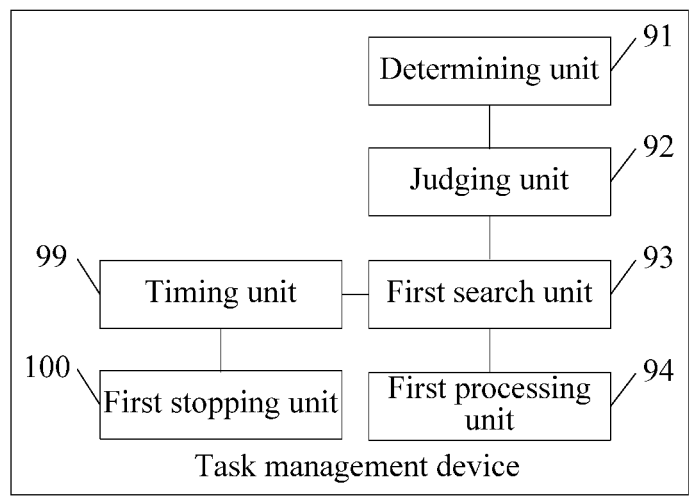
FIG. 12 is a schematic diagram of a structure of another task management device according to an embodiment of the present disclosure.

Optionally, as shown in FIG. 12, the device may further include a timing unit 99 configured to start a timer for the at least one background task corresponding to the first scenario, and a first stopping unit 100 configured to stop a system component used by the at least one background task corresponding to the first scenario when the timer exceeds a preset threshold.

Optionally, the system component includes but is not limited to a timer, a sleep lock, and broadcast notification. In addition, a status value of the system component when the system component is paused may be saved in the device such that the background task can call the saved status value of the system component after the limitation processing is released. In addition, the system component used by the at least one background task corresponding to the first scenario is stopped only when the timer reaches the preset threshold (for example, 10 s, 30 s, or the like). This may avoid frequently stopping the system component used by the at least one background task corresponding to the first scenario.

Figure 13:
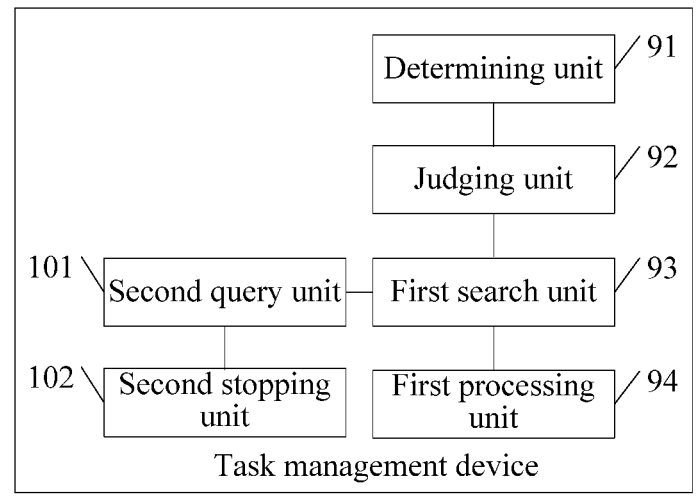
FIG. 13 is a schematic diagram of a structure of another task management device according to an embodiment of the present disclosure.

Optionally, as shown in FIG. 13, the device may further include a second query unit 101 configured to query whether the at least one background task uses a system component, and a second stopping unit 102 configured to stop the system component if the second query unit 101 finds that the at least one background task uses the system component.

In this implementation manner, because the system component used by the at least one background task corresponding to the first scenario is stopped, power consumption and power loss of the device may be reduced.

Optionally, the processing for reducing system resource usage includes at least one of the following manners: freezing the at least one background task, stopping the at least one background task, and limiting a system resource used by the at least one background task.

In this way, the first processing unit 94 may freeze the at least one background task corresponding to the first scenario, or stop the at least one background task corresponding to the first scenario, or limit a system resource used by the at least one background task corresponding to the first scenario.

Optionally, freezing the at least one background task corresponding to the first scenario may be prohibiting the background task from calling a system resource, for example, prohibiting a CPU from calling the at least one background task corresponding to the first scenario. Furthermore, a task scheduler of an operating system is used to prohibit the at least one background task corresponding to the first scenario from participating in any scheduling. Because the at least one background task corresponding to the first scenario is prohibited from calling the system resource, power consumption of the device is reduced.

Optionally, limiting a system resource used by the at least one background task corresponding to the first scenario may be limiting a time within which the CPU calls the at least one background task corresponding to the first scenario. For example, a time value for CPU calling is set for the at least one background task corresponding to the first scenario such that the CPU can call the at least one background task corresponding to the first scenario within a time indicated by the time value. In addition, limiting a system resource used by the at least one background task corresponding to the first scenario may further be limiting use of the system resource by the at least one background task corresponding to the first scenario from using the system resource. For example, limiting the at least one background task corresponding to the first scenario or limiting use of memory space by the at least one background task corresponding to the first scenario. In addition, it may further be using different limitation measures depending on different scenarios corresponding to the at least one background task corresponding to the first scenario. Because use of the system resource by the at least one background task corresponding to the first scenario is limited in the foregoing step, power consumption of the device is reduced.

Optionally, when a temperature reaches a preset temperature threshold, the determining unit 91 may be further configured to determine, according to the foreground task, a first scenario corresponding to the foreground task.

The temperature may be a temperature of the device, where the temperature of the device may further refer to a temperature of the CPU of the device or a temperature of a modem of the device.

In this implementation manner, it may be implemented that limitation processing is performed on the background task only when the temperature of the device reaches the preset temperature threshold.

Optionally, the device may be further configured to release the limitation processing on the at least one background task corresponding to the first scenario. Furthermore, when the first scenario is not in the first list, the limitation processing is released for the background task that has undergone the limitation processing.

Optionally, the device may be any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solution, multiple optional implementation manners are implemented on the basis of the first embodiment, all of which can reduce power consumption and power loss of a device.

Figure 14:
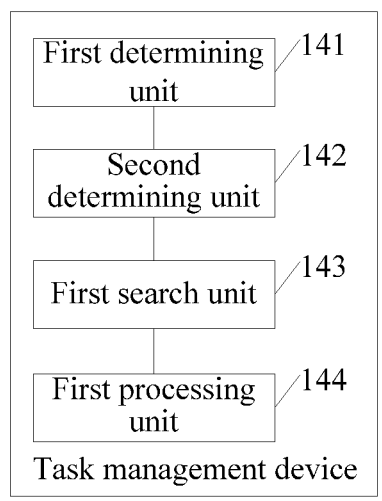
FIG. 14 is a schematic diagram of a structure of another task management device according to an embodiment of the present disclosure.

Referring to FIG. 14, FIG. 14 is a schematic diagram of a structure of another task management device according to an embodiment of the present disclosure. As shown in FIG. 14, the task management device includes a first determining unit 141, a second determining unit 142, a first search unit 143, and a first processing unit 144.

The first determining unit 141 is configured to determine, according to a foreground task, a first scenario corresponding to the foreground task.

Optionally, the first determining unit 141 may determine, when a current task is switched, a corresponding first scenario according to the current task. For example, when the current task, a music task, is being executed, the task enters a music scenario or a download scenario. In this way, it can be determined that the first scenario corresponding to the foreground task may be the music scenario or the download scenario, or the like. In addition, the foreground task may be one or multiple foreground tasks. In the case of multiple foreground tasks, the first determining unit 141 may be configured to determine, according to multiple foreground tasks, a first scenario corresponding to each foreground task. That is, the first determining unit 141 may be configured to determine, according to at least one foreground task, a first scenario corresponding to each foreground task.

The second determining unit 142 is configured to determine a second scenario except the first scenario that corresponds to the foreground task and is determined by the first determining unit 141, where the second scenario is a scenario in which task limitation is allowed and the second scenario corresponds to at least one background task.

Optionally, the second scenario may refer to one or more scenarios. In addition, the second scenario may refer to all scenarios except the first scenario, or one or more scenarios except the first scenario, which is not limited in this embodiment. In addition, the second scenario may be a pre-determined scenario, for example, a scenario that is set for receiving an operation input by a user. In this way, the scenario in which task limitation is allowed, and that is set according to the operation input by the user and meets the user's requirements or habits can be implemented.

Optionally, the second scenario may be a scenario except the first scenario and not in a second list, where the second list may include a scenario in which task limitation is prohibited.

The first search unit 143 is configured to search for the at least one background task corresponding to the second scenario that is determined by the second determining unit 142.

Optionally, the at least one background task corresponding to the second scenario may refer to at least one background task in all background tasks corresponding to the second scenario, or the at least one background task corresponding to the second scenario may refer to all background tasks corresponding to the second scenario. In addition, the first search unit 143 may further search for at least two background tasks that are in the background tasks corresponding to the second scenario and that will not affect other tasks or an operating system after undergoing limitation processing, or search for at least one pre-determined background task in the background tasks corresponding to the second scenario, or search for at least one background task that is in the background tasks corresponding to the second scenario and whose UID corresponds to a common user. For example, the first search unit 143 may be configured to search for a UID of each background task corresponding to the second scenario, and search for a background task whose UID corresponds to a common user as the at least one background task corresponding to the second scenario.

The foregoing operations can implement that the at least one background task that is corresponding to the second scenario and is searched for by the first search unit 143 is the background task whose UID corresponds to a common user.

Optionally, the device may be further configured to ignore a background task whose UID corresponds to a system user in the at least one background task corresponding to the second scenario. That is, processing is not performed on the background task whose UID corresponds to a system user.

Optionally, the first search unit 143 may be configured to search for at least one background task whose system resource usage reaches a preset threshold in the background tasks corresponding to the second scenario.

The first processing unit 144 is configured to perform limitation processing on the at least one background task that corresponds to the second scenario and is searched for by the first search unit 143, where the limitation processing refers to processing for reducing system resource usage.

Figure 15:
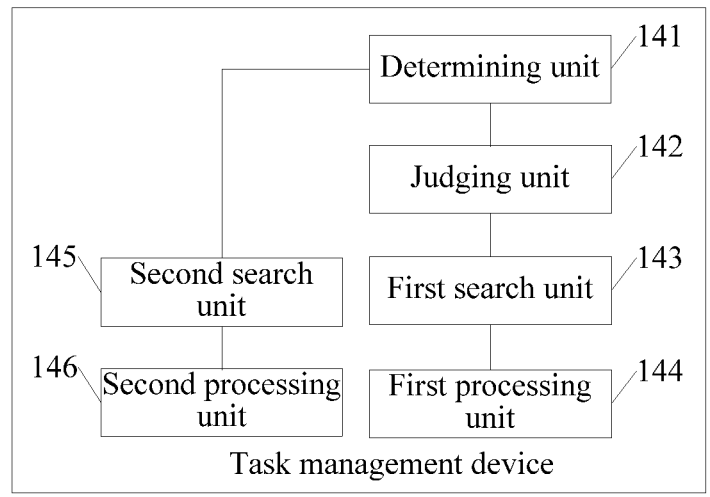
FIG. 15 is a schematic diagram of a structure of another task management device according to an embodiment of the present disclosure.

Optionally, as shown in FIG. 15, the device may further include a second search unit 145 configured to search for at least one background task corresponding to the first scenario, and a second processing unit 146 configured to perform the limitation processing on the at least one background task corresponding to the first scenario if a user identifier of the at least one background task corresponding to the first scenario corresponds to a common user.

Figure 16:
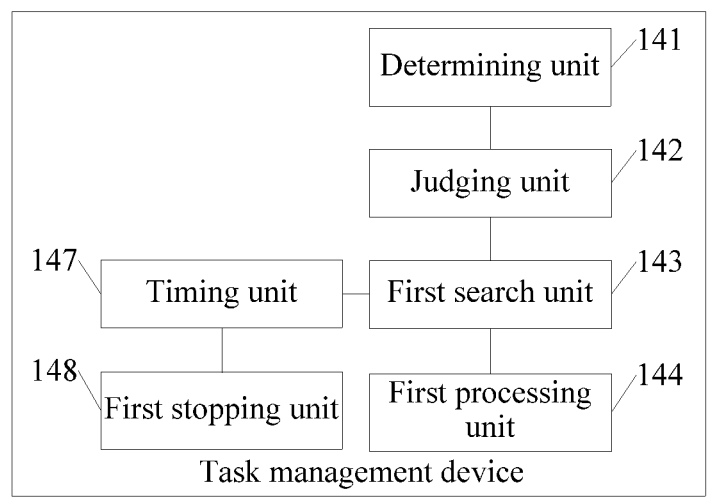
FIG. 16 is a schematic diagram of a structure of another task management device according to an embodiment of the present disclosure.

Optionally, as shown in FIG. 16, the device may further include a timing unit 147 configured to start a timer for the at least one background task corresponding to the second scenario, and a first stopping unit 148 configured to stop, when the timer exceeds a preset threshold, a system component used by the at least one background task corresponding to the second scenario.

Optionally, the system component includes but is not limited to a timer, a sleep lock, and broadcast notification. Meanwhile, a status value of the system component when the system component is paused may be saved in the foregoing step such that the background task can call the saved status value of the system component after the limitation processing is released. In addition, the system component used by the at least one background task corresponding to the second scenario is stopped only when the timer reaches the preset threshold (for example, 10 s, 30 s, or the like). This may avoid frequently stopping the system component used by the at least one background task corresponding to the second scenario.

Figure 17:
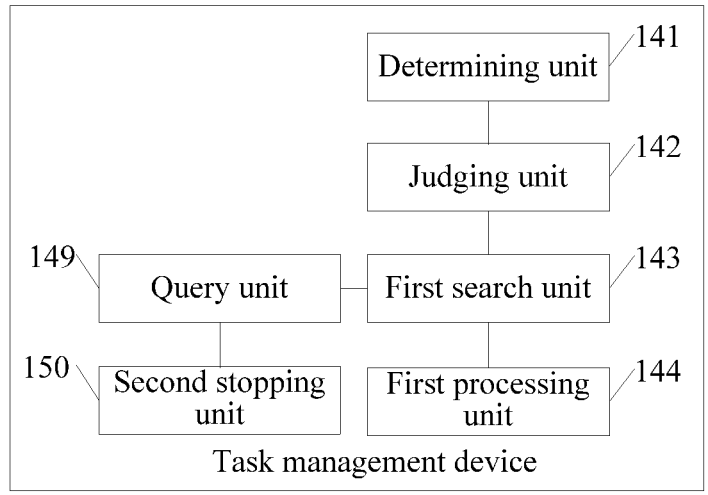
FIG. 17 is a schematic diagram of a structure of another task management device according to an embodiment of the present disclosure.

Optionally, as shown in FIG. 17, the device may further include a query unit 149 configured to query whether the at least one background task uses a system component, and a second stopping unit 150 configured to stop the system component if the query unit finds that the at least one background task uses the system component.

In this implementation manner, because the system component used by the at least one background task corresponding to the second scenario is stopped, power consumption and power loss of the device may be reduced.

Optionally, the processing for reducing system resource usage may include at least one of the following manners: freezing the at least one background task, stopping the at least one background task, and limiting a system resource used by the at least one background task.

In this case, the first processing unit 144 may freeze the at least one background task corresponding to the second scenario, or stop the at least one background task corresponding to the second scenario, or limit a system resource used by the at least one background task corresponding to the second scenario.

Optionally, freezing the at least one background task corresponding to the second scenario may be prohibiting the background task from calling a system resource, for example, prohibiting a CPU from calling the at least one background task corresponding to the first scenario. Further, a task scheduler of an operating system is used to prohibit the at least one background task corresponding to the first scenario from participating in any scheduling. Because the at least one background task corresponding to the second scenario is prohibited from calling the system resource, power consumption of the device is reduced.

Optionally, limiting a system resource used by the at least one background task corresponding to the second scenario may be limiting a time within which the CPU calls the at least one background task corresponding to the second scenario. For example, a time value for CPU calling is set for the at least one background task corresponding to the second scenario such that the CPU can call the at least one background task corresponding to the second scenario within a time indicated by the time value. In addition, limiting a system resource used by the at least one background task corresponding to the second scenario may further be limiting use of the system resource by the at least one background task corresponding to the second scenario. For example, limiting use of a network bandwidth by the at least one background task corresponding to the second scenario or limiting use of memory space by the at least one background task corresponding to the second scenario. In addition, it may further be using different limitation measures depending on different scenarios corresponding to the at least one background task corresponding to the second scenario. Because use of the system resource by the at least one background task corresponding to the second scenario is limited in the foregoing step, power consumption of the device is reduced.

Optionally, the device may be any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solution, a first scenario corresponding to a foreground task is determined according to the foreground task. A second scenario except the first scenario corresponding to the foreground task is determined, where the second scenario is a scenario in which task limitation is allowed and the second scenario corresponds to at least one background task. The at least one background task corresponding to the second scenario is searched for, and limitation processing is performed on the at least one background task corresponding to the second scenario, where the limitation processing refers to processing for reducing system resource usage. Therefore, power consumption and power loss of a device can be reduced.

Figure 18:
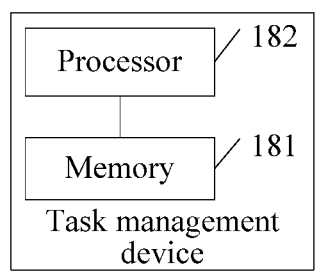
FIG. 18 is a schematic diagram of a structure of another task management device according to an embodiment of the present disclosure.

Referring to FIG. 18, FIG. 18 is a schematic diagram of a structure of another task management device according to an embodiment of the present disclosure. As shown in FIG. 18, the task management device includes a memory 181 and a processor 182 connected to the memory 181, where the memory 181 is configured to store program code, and the processor 182 is configured to invoke a program stored in the memory 181 to perform the following operations: determining, according to a foreground task, a first scenario corresponding to the foreground task, searching for, when the first scenario corresponding to the foreground task is in a first list, at least one background task corresponding to the first scenario, where the first list includes a scenario in which task limitation is allowed, and performing limitation processing on the at least one background task corresponding to the first scenario, where the limitation processing refers to processing for reducing system resource usage.

Optionally, the processor 182 may further determine, when a current task is switched, a corresponding first scenario according to the current task. For example, when the current task, a music task, is being executed, the task enters a music scenario or a download scenario. In this way, it can be determined that the first scenario corresponding to the foreground task may be the music scenario or the download scenario, or the like. In addition, the foreground task may be one or multiple foreground tasks. In the case of multiple foreground tasks, the processor 182 may be configured to determine, according to multiple foreground tasks, a first scenario corresponding to each foreground task. That is, the processor 182 may determine, according to at least one foreground task, a first scenario corresponding to each foreground task.

Optionally, the scenario in which task limitation is allowed and that is included in the first list may be a scenario that is set for receiving an operation input by a user. In this way, the scenario in which task limitation is allowed, and that is set according to the operation input by the user and meets the user's requirements or habits can be implemented. For example, a user likes to reduce power consumption of a device, and the user may set in the first list multiple scenarios in which task limitation is allowed, for example, setting a browser scenario, a game scenario, a navigation scenario, or the like as the scenario in which task limitation is allowed. In this way, when the first scenario corresponding to the current task is the browser scenario, the game scenario, or the navigation scenario, the processor 182 may perform a search operation to reduce power consumption of the device.

Optionally, the scenario in which task limitation is allowed and that is included in the first list may be automatically set according to performance of a device. For example, when the device has better performance, for example, a CPU of the device is running at a high speed, the device has a larger memory, or the device has enough battery, only a few scenarios in which task limitation is allowed may be set in the first list. For example, when the device has poor performance, for example, the CPU of the device is running at a low speed, the device has a smaller memory, or the device does not have enough battery, more scenarios in which task limitation is allowed may be set in the first list because the first list has a large number of scenarios in which task limitation is allowed.

Optionally, the at least one background task corresponding to the first scenario may refer to at least one background task in all background tasks corresponding to the first scenario, or the at least one background task corresponding to the first scenario may refer to all background tasks corresponding to the first scenario. This embodiment sets no limit thereto.

Optionally, the limitation processing may be processing used to reduce current system resource usage.

In another embodiment, the processor 182 may be further configured to perform the following operations: determining, according to a foreground task, a first scenario corresponding to the foreground task, determining whether the first scenario is in the first list, if yes, searching for at least one background task corresponding to the first scenario, performing limitation processing on the at least one background task corresponding to the first scenario, where the limitation processing refers to processing for reducing system resource usage, and when a result of the determining is no, ending the process.

Optionally, the processor 182 may further search for at least one background task that is in background tasks corresponding to the first scenario and that will not affect other tasks or an operating system after undergoing limitation processing, or search for at least one pre-determined background task in the background tasks corresponding to the first scenario, or search for at least one background task that is in background tasks corresponding to the first scenario and whose user identifier corresponds to a common user. For example, the operation, performed by the processor 182, of searching for at least one background task corresponding to the first scenario may include searching for a user identifier of each background task corresponding to the first scenario, and searching for a background task whose UID corresponds to a common user as the at least one background task corresponding to the first scenario.

That is, this operation is used to implement that the at least one background task that is corresponding to the first scenario and is searched for by the processor 182 is the background task whose UID corresponds to a common user. A UID is an inherent identifier of each task and is used to uniquely identify the task. In addition, a UID may correspond to a system user and a common user. When a UID of a background task corresponds to a system user, it indicates that the background task is a background task included in an operating system. When a UID of a background task corresponds to a common user, it indicates that the background task is not a background task included in an operating system.

Optionally, the processor 182 may be further configured to ignore a background task whose UID corresponds to a system user in the at least one background task corresponding to the first scenario. That is, processing is not performed on the background task whose UID corresponds to a system user.

Optionally, the processor 182 may search for at least one background task that is in background tasks corresponding to the first scenario and whose system resource usage reaches a preset threshold. For example, at least one background task that is in the background tasks corresponding to the first scenario and whose CPU resource usage reaches 10% of CPU resources is searched for, or at least one background task that is in the background tasks corresponding to the first scenario and whose sleep lock holding duration reaches 10 minutes is searched for, or at least one background task that is in the background tasks corresponding to the first scenario and whose average data download speed reaches 10M per minute is searched for.

Optionally, the processor 182 may be further configured to perform the operations of searching for a second scenario except the first scenario corresponding to the foreground task, where the second scenario corresponds to at least one background task, and the first list includes the second scenario, and performing the limitation processing on the at least one background task corresponding to the second scenario.

Optionally, the second scenario may refer to one or more scenarios. In addition, the second scenario may refer to all scenarios except the first scenario, or one or more scenarios except the first scenario, which is not limited in this embodiment.

In addition, the at least one background task corresponding to the second scenario may refer to at least one background task in all background tasks corresponding to the second scenario, or the at least one background task corresponding to the second scenario may refer to all background tasks corresponding to the second scenario. This embodiment sets no limit thereto. In addition, the second scenario may be a pre-determined scenario, for example, a scenario that is set for receiving an operation input by a user. In this way, the scenario in which task limitation is allowed, and that is set according to the operation input by the user and meets the user's requirements or habits can be implemented. In addition, the processor 182 may further search for at least one background task that is in the background tasks corresponding to the second scenario and will not affect other tasks or an operating system after undergoing limitation processing, or search for at least one pre-determined background task in the background tasks corresponding to the second scenario, or search for at least one background task that is in the background tasks corresponding to the second scenario and whose user identifier corresponds to a common user.

Optionally, the second scenario may be a scenario except the first scenario and not in a second list, where the second list may include a scenario in which task limitation is prohibited. In addition, the second list may be referred to as a blacklist. The scenario in which task limitation is prohibited may be a scenario that is set for receiving an operation input by a user. In this way, the scenario in which task limitation is prohibited, and that is set according to the operation input by the user and meets the user's requirements or habits can be implemented. For example, the user may set, in the second list, a scenario that requires user attention as the scenario in which task limitation is prohibited, for example, a short message service message scenario, a call scenario, and a download scenario. Alternatively, the scenario in which task limitation is prohibited may be automatically set according to performance of a device. For example, when the device has better performance, for example, a CPU of the device is running at a high speed, the device has a larger memory, or the device has enough battery, more scenarios in which task limitation is prohibited may be set in the second list. For example, when the device has poor performance, for example, the CPU of the device is running at a low speed, the device has a smaller memory, or the device does not have enough battery, only a few scenarios in which task limitation is prohibited may be set in the second list.

Optionally, before the processor 182 performs the operation of performing limitation processing on the at least one background task corresponding to the first scenario, the processor 182 may be further configured to perform the operations of querying a UID of the at least one background task corresponding to the first scenario, and ignoring the at least one background task if the UID of the at least one background task corresponding to the first scenario corresponds to a system user, or performing the limitation processing on the at least one background task if the UID of the at least one background task corresponds to a common user. That is, step 204 is performing the limitation processing on the at least one background task whose UID corresponds to a common user.

In this implementation manner, because the background task whose UID corresponds to a common user is not a task of an operating system, other tasks are not affected after limitation processing is performed on these background tasks. Therefore, limitation processing is performed only on a background task whose UID corresponds to a common user in step 204, which can reduce power consumption and power loss of the device without affecting other tasks.

Optionally, before the processor 182 performs the operation of performing limitation processing on the at least one background task corresponding to the first scenario, the processor 182 may be further configured to perform the operations of starting a timer for the at least one background task corresponding to the first scenario, and stopping a system component used by the at least one background task corresponding to the first scenario when the timer exceeds a preset threshold.

Optionally, the system component includes but is not limited to a timer, a sleep lock, and broadcast notification. Meanwhile, a status value of the system component when the system component is paused may be saved in the foregoing step such that the background task can call the saved status value of the system component after the limitation processing is released. In addition, the system component used by the at least one background task corresponding to the first scenario is stopped only when the timer reaches the preset threshold (for example, 10 s, 30 s, or the like). This may avoid frequently stopping the system component used by the at least one background task corresponding to the first scenario.

Optionally, before the processor 182 performs the operation of performing limitation processing on the at least one background task corresponding to the first scenario, the processor 182 may be further configured to perform the operations of querying whether the at least one background task corresponding to the first scenario uses a system component, and stopping the system component if the at least one background task corresponding to the first scenario uses the system component.

In this implementation manner, because the system component used by the at least one background task corresponding to the first scenario is stopped, power consumption and power loss of the device may be reduced.

Optionally, the processing for reducing system resource usage may include at least one of the following manners: freezing the at least one background task, stopping the at least one background task, and limiting a system resource used by the at least one background task.

In this case, the processor 182 may freeze the at least one background task corresponding to the first scenario, or stop the at least one background task corresponding to the first scenario, or limit a system resource used by the at least one background task corresponding to the first scenario.

Optionally, the operation, performed by the processor 182, of determining, according to a foreground task, a first scenario corresponding to the foreground task may include determining, according to the foreground task, a first scenario corresponding to the foreground task when a temperature reaches a preset temperature threshold.

The temperature may be a temperature of the device, where the temperature of the device may further refer to a temperature of the CPU of the device or a temperature of a modem of the device.

In this implementation manner, it may be implemented that limitation processing is performed on the background task only when the temperature of the device reaches the preset temperature threshold.

Optionally, the processor 182 may be further configured to perform the operation of releasing the limitation processing on the at least one background task corresponding to the first scenario. Furthermore the limitation processing is released for the background task that has undergone the limitation processing when the first scenario is not in the first list.

Optionally, the method may be applied to any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solutions, a first scenario corresponding to a foreground task is determined according to the foreground task, and when the first scenario corresponding to the foreground task is in a first list, at least one background task corresponding to the first scenario is searched for, where the first list includes a scenario in which task limitation is allowed, and limitation processing is performed on the at least one background task corresponding to the first scenario, where the limitation processing refers to processing for reducing system resource usage. In this way, limitation processing is implemented on at least one background task corresponding to a scenario in which task limitation is allowed. Compared with the prior art in which a background task is always being executed, this embodiment of the present disclosure can reduce power consumption and power loss of a device.

Figure 19:
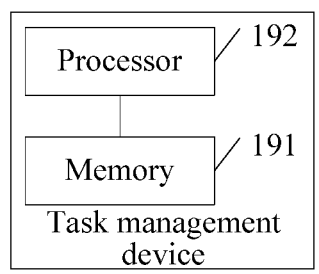
FIG. 19 is a schematic diagram of a structure of another task management device according to an embodiment of the present disclosure.

Referring to FIG. 19, FIG. 19 is a schematic diagram of a structure of another task management device according to an embodiment of the present disclosure. As shown in FIG. 19, the task management device includes a memory 191 and a processor 192 connected to the memory 191, where the memory 191 is configured to store program code, and the processor 192 is configured to invoke a program stored in the memory 191 to perform the operations of determining, according to a foreground task, a first scenario corresponding to the foreground task, determining a second scenario except the first scenario corresponding to the foreground task, where the second scenario is a scenario in which task limitation is allowed and the second scenario corresponds to at least one background task, searching for the at least one background task corresponding to the second scenario, and performing limitation processing on the at least one background task corresponding to the second scenario, where the limitation processing refers to processing for reducing system resource usage.

Optionally, the processor 192 may further determine, when a current task is switched, a corresponding first scenario according to the current task. For example, when the current task, a music task, is being executed, the task enters a music scenario or a download scenario. In this way, it can be determined that the first scenario corresponding to the foreground task may be the music scenario, the download scenario, or the like. In addition, the foreground task may be one or multiple foreground tasks. In the case of multiple foreground tasks, the processor 192 may be configured to determine, according to multiple foreground tasks, a first scenario corresponding to each foreground task. That is, the processor 192 may determine, according to at least one foreground task, a first scenario corresponding to each foreground task.

Optionally, the second scenario may refer to one or more scenarios. In addition, the second scenario may refer to all scenarios except the first scenario, or one or more scenarios except the first scenario, which is not limited in this embodiment. In addition, the second scenario may be a pre-determined scenario, for example, a scenario that is set for receiving an operation input by a user. In this way, the scenario in which task limitation is allowed, and that is set according to the operation input by the user and meets the user's requirements or habits can be implemented.

Optionally, the second scenario may be a scenario except the first scenario and not in a second list, where the second list may include a scenario in which task limitation is prohibited.

Optionally, the at least one background task corresponding to the second scenario may refer to at least one background task in all background tasks corresponding to the second scenario, or the at least one background task corresponding to the second scenario may refer to all background tasks corresponding to the second scenario. In addition, the processor 192 may further search for at least two background tasks that are in the background tasks corresponding to the second scenario and that will not affect other tasks or an operating system after undergoing limitation processing, or search for at least one pre-determined background task in the background tasks corresponding to the second scenario, or search for at least one background task that is in the background tasks corresponding to the second scenario and whose UID corresponds to a common user. For example, the operation, performed by the processor 192, of searching for at least one background task corresponding to the second scenario may include searching for a UID of each background task corresponding to the second scenario, and searching for a background task whose UID corresponds to a common user as the at least one background task corresponding to the second scenario.

That is, this step is used to implement that the at least one background task that is corresponding to the second scenario and is searched for by the processor 192 is the background task whose UID corresponds to a common user.

Optionally, the processor 192 may be further configured to perform the operation of ignoring a background task whose UID corresponds to a system user in the at least one background task corresponding to the second scenario. That is, processing is not performed on the background task whose UID corresponds to a system user.

Optionally, the processor 192 may search for at least one background task whose system resource usage reaches a preset threshold in the background tasks corresponding to the second scenario.

Optionally, the processor 192 may be further configured to perform the operations of searching for at least one background task corresponding to the first scenario, and performing the limitation processing on the at least one background task corresponding to the first scenario if a UID of the at least one background task corresponding to the first scenario corresponds to a common user.

For this implementation manner of this embodiment, further refer to the implementation manner in which the limitation processing is performed on the at least one background task corresponding to the first scenario in the first and second embodiments, which is not repeatedly described here.

Optionally, before the processor 192 performs the operation of performing limitation processing on the at least one background task corresponding to the second scenario, the processor 192 may be further configured to perform the operations of starting a timer for the at least one background task corresponding to the second scenario, and stopping, when the timer exceeds a preset threshold, a system component used by the at least one background task corresponding to the second scenario.

Optionally, the system component includes but is not limited to a timer, a sleep lock, and broadcast notification. Meanwhile, a status value of the system component when the system component is paused may be saved in the foregoing step such that the background task can call the saved status value of the system component after the limitation processing is released. In addition, the system component used by the at least one background task corresponding to the second scenario is stopped only when the timer reaches the preset threshold (for example, 10 s, 30 s, or the like). This may avoid frequently stopping the system component used by the at least one background task corresponding to the second scenario.

Optionally, before the processor 192 performs the operation of performing limitation processing on the at least one background task corresponding to the second scenario, the processor 192 may be further configured to perform the operations of querying whether the at least one background task uses a system component, and stopping the system component if the at least one background task uses the system component.

In this implementation manner, because the system component used by the at least one background task corresponding to the second scenario is stopped, power consumption and power loss of the device may be reduced.

Optionally, processing for reducing system resource usage may include at least one of the following manners: freezing the at least one background task, stopping the at least one background task, and limiting a system resource used by the at least one background task.

In this case, the processor 192 may freeze the at least one background task corresponding to the second scenario, stop the at least one background task corresponding to the second scenario, or limit a system resource used by the at least one background task corresponding to the second scenario.

Optionally, the method may be applied to any devices having a multi-task system, such as a tablet computer, a mobile phone, an e-reader, a remote control, a PC, a notebook computer, an in-vehicle device, a web TV, a wearable device, or other intelligent devices having a network function.

In the foregoing technical solution, a first scenario corresponding to a foreground task is determined according to the foreground task. A second scenario except the first scenario corresponding to the foreground task is determined, where the second scenario is a scenario in which task limitation is allowed and the second scenario corresponds to at least one background task. The at least one background task corresponding to the second scenario is searched for, and limitation processing is performed on the at least one background task corresponding to the second scenario, where the limitation processing refers to processing for reducing system resource usage. Therefore, power consumption and power loss of a device can be reduced.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disc, an optical disc, a read-only memory (ROM), or a random access memory (RAM).

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A task management method, implemented by an electronic device, the task management method comprising:
    executing a foreground task based on an input to the electronic device;
    determining, according to the foreground task, that a background task limitation is allowed;
    determining a first background task and a second background task;
    performing limitation processing on the first background task, wherein a user identifier of the first background task corresponds to a common user, wherein the limitation processing comprises at least one of freezing the first background task, stopping the first background task, or limiting a system resource used by the first background task;
    stopping the first background task from using a system component when the first background task uses the system component before performing the limitation processing on the first background task; and
    skipping limitation processing on the second background task, wherein a user identifier of the second background task corresponds to a system user.

2. The task management method of claim 1, wherein performing the limitation processing on the first background task comprises reducing system resource usage of the first background task.

3. The task management method of claim 1, wherein determining the first background task comprises determining the first background task when a system resource usage of the first background task reaches a preset threshold.

4. The task management method of claim 1, wherein determining the second background task comprises determining the second background task when a system resource usage of the second background task reaches a preset threshold.

5. The task management method of claim 1, further comprising:
    determining, according to the foreground task, a third background task; and
    performing limitation processing on the third background task.

6. The task management method of claim 1, further comprising saving a status value of the system component when the system component stops using the first background task.

7. An electronic device, comprising:
    at least one processor; and
    at least one memory coupled to the at least one processor and configured to store computer instructions for execution by the at least one processor, wherein the computer instructions cause the at least one processor to be configured to:
        execute a foreground task based on an input to the electronic device;
        determine, according to the foreground task, that a background task limitation is allowed;
        determine a first background task and a second background task;
        perform limitation processing on the first background task, wherein a user identifier of the first background task corresponds to a common user, wherein the limitation processing comprises at least one of freezing the first background task, stopping the first background task, or limiting a system resource used by the first background task;
        stop the first background task from using a system component when the first background task uses the system component before performing the limitation processing on the first background task; and
        skip limitation processing on the second background task, wherein a user identifier of the second background task corresponds to a system user.

8. The electronic device of claim 7, wherein the computer instructions cause the at least one processor to be configured to perform limitation processing on the first background task by reducing system resource usage of the first background task.

9. The electronic device of claim 7, wherein the computer instructions further cause the at least one processor to be configured to determine the first background task when a system resource usage of the first background task reaches a preset threshold.

10. The electronic device of claim 7, wherein the computer instructions further cause the at least one processor to be configured to determine the second background task when a system resource usage of the second background task reaches a preset threshold.

11. The electronic device of claim 7, wherein the computer instructions further cause the at least one processor to be configured to:
- determine, according to the foreground task, a third background task; and
- perform limitation processing on the third background task.

12. The electronic device of claim 7, wherein the computer instructions further cause the at least one processor to be configured to save a status value of the system component when the system component stops using the first background task.

13. An electronic device, comprising:
- at least one processor; and
- at least one memory coupled to the at least one processor and configured to store computer instructions for execution by the at least one processor, wherein the computer instructions cause the at least one processor to be configured to:
- allow a background task limitation;
- determine a background task that needs to be frozen;
- freeze the background task;
- stop the background task from using a system component when the background task uses the system component before freezing the background task;
- resume the system component when the electronic device displays a main user interface; and
- unfreeze the background task when the electronic device displays the main user interface.

14. The electronic device of claim 13, wherein the background task that needs to be frozen comprises a background task that is prohibited from calling a system resource, and wherein the computer instructions further cause the at least one processor to be configured to prohibit the background task from calling the system resource.

15. The electronic device of claim 13, wherein the computer instructions further cause the at least one processor to be configured to save a status value of the system component when the system component is stopped.

16. The task management method of claim 1, wherein the first background task and the second background task correspond to threads of application programs.

17. The task management method of claim 1, wherein the first background task and the second background task correspond to tasks that do not require user interaction.

18. The electronic device of claim 8, wherein the first background task and the second background task correspond to threads of application programs.

19. The electronic device of claim 7, wherein the first background task and the second background task correspond to tasks that do not require user interaction.

20. The electronic device of claim 13, wherein the background task corresponds to a thread of an application program and does not require user interaction.

* * * * *

UNITED STATES PATENT AND TRADEMARK OFFICE
CERTIFICATE OF CORRECTION

Page 1 of 1

PATENT NO. : 11,209,894 B2
APPLICATION NO. : 16/427944
DATED : December 28, 2021
INVENTOR(S) : Wei et al.

It is certified that error appears in the above-identified patent and that said Letters Patent is hereby corrected as shown below:

In the Claims

Claim 18, Column 36, Line 21: "claim 8" should read "claim 7"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*